United States Patent
Asterjadhi et al.

(10) Patent No.: US 12,167,469 B2
(45) Date of Patent: *Dec. 10, 2024

(54) RANDOM ACCESS RESOURCE UNIT ALLOCATION FOR A MULTIPLE BSSID NETWORK

(71) Applicant: QUALCOMM Incorporated, San Diego, CA (US)

(72) Inventors: Alfred Asterjadhi, San Diego, CA (US); James Simon Cho, Stateline, NV (US); George Cherian, San Diego, CA (US); Simone Merlin, San Diego, CA (US); Abhishek Pramod Patil, San Diego, CA (US)

(73) Assignee: QUALCOMM Incorporated, San Diego, CA (US)

( * ) Notice: Subject to any disclaimer, the term of this patent is extended or adjusted under 35 U.S.C. 154(b) by 0 days.

This patent is subject to a terminal disclaimer.

(21) Appl. No.: 18/321,135

(22) Filed: May 22, 2023

(65) Prior Publication Data

US 2023/0371083 A1    Nov. 16, 2023

Related U.S. Application Data

(63) Continuation of application No. 17/375,925, filed on Jul. 14, 2021, now Pat. No. 11,696,338, which is a
(Continued)

(51) Int. Cl.
*H04W 74/0833*    (2024.01)
*H04L 69/323*    (2022.01)
(Continued)

(52) U.S. Cl.
CPC ..... *H04W 74/0833* (2013.01); *H04W 74/006* (2013.01); *H04L 69/323* (2013.01); *H04W 84/12* (2013.01); *H04W 88/08* (2013.01)

(58) Field of Classification Search
CPC .............. H04L 69/323; H04W 74/006; H04W 74/0833; H04W 84/12; H04W 88/08
See application file for complete search history.

(56) References Cited

U.S. PATENT DOCUMENTS 9,992,738 B2    6/2018    Wentink et al.
10,091,778 B2    10/2018    Asterjadhi et al.
(Continued)

FOREIGN PATENT DOCUMENTS

CA    2963228 A1    4/2016
CN    103222316 A    7/2013
(Continued)

OTHER PUBLICATIONS

Chu L., et al., (Marvell): "Multiple BSSID and MU Discussion; 11-16-1454-00-00ax-multiple-bssid-and-mu-discussion", IEEE Draft; 11-16-1454-00-00ax-multiple-bssid-and-mu-discussion, IEEE-SA Mentor, Piscataway, NJ USA, vol. 802.11ax Nov. 8, 2016, pp. 1-10, XP068110876, Retrieved from the Internet: URL: https://mentor.ieee.org/802.11/dcn/16/11-16-1454-00-00ax-multiple-bssid-and-mu-discussion.pptx [retrieved on Nov. 8, 2016].
(Continued)

*Primary Examiner* — Melanie Jagannathan
(74) *Attorney, Agent, or Firm* — Patterson & Sheridan LLP

(57) ABSTRACT

An access point (AP) may prioritize the allocation of uplink resources between multiple basic service sets (BSSs). In some aspects, the AP may select one of a plurality of BSSs, may allocate one or more random-access resource units (RUs) to only the selected BSS, and may transmit, for each of the selected BSSs, a respective frame indicating the random-access RUs allocated to that BSS. Wireless devices belonging to the selected BSS may contend for access to the
(Continued)

random-access RUs allocated by the frame, and then transmit uplink data using the random-access RUs.

30 Claims, 16 Drawing Sheets

Related U.S. Application Data continuation of application No. 16/106,705, filed on Aug. 21, 2018, now Pat. No. 11,083,021, which is a continuation-in-part of application No. 15/482,679, filed on Apr. 7, 2017, now Pat. No. 10,091,778.

(60) Provisional application No. 62/322,772, filed on Apr. 14, 2016.

(51) Int. Cl.
 H04W 74/00 (2009.01)
 H04W 84/12 (2009.01)
 H04W 88/08 (2009.01)

(56) References Cited

U.S. PATENT DOCUMENTS

| | | | |
|---|---|---|---|
| 10,154,520 B1 | 12/2018 | Hedayat et al. | |
| 10,237,891 B1 | 3/2019 | Chu et al. | |
| 10,278,210 B2 | 4/2019 | Ahn et al. | |
| 10,849,157 B1 | 11/2020 | Gopalakrishnan et al. | |
| 11,083,021 B2 | 8/2021 | Asterjadhi et al. | |
| 2008/0102852 A1 | 5/2008 | Du et al. | |
| 2015/0139209 A1 | 5/2015 | Park et al. | |
| 2015/0280953 A1 | 10/2015 | Porat et al. | |
| 2016/0227565 A1 | 8/2016 | Ghosh | |
| 2017/0127452 A1 | 5/2017 | Ahmed et al. | |
| 2017/0181187 A1 | 6/2017 | Asterjadhi et al. | |
| 2017/0272138 A1 | 9/2017 | Chun et al. | |
| 2017/0272146 A1 | 9/2017 | Matsuo | |
| 2017/0303245 A1 | 10/2017 | Asterjadhi et al. | |
| 2017/0374681 A1 | 12/2017 | Kim et al. | |
| 2018/0020460 A1 | 1/2018 | Hedayat | |
| 2018/0124806 A1* | 5/2018 | Kim | H04W 72/0446 |
| 2018/0132175 A1 | 5/2018 | Choi et al. | |
| 2018/0167882 A1 | 6/2018 | Choi et al. | |
| 2018/0199271 A1* | 7/2018 | Viger | H04W 92/20 |
| 2018/0376486 A1 | 12/2018 | Ahn et al. | |
| 2019/0007977 A1 | 1/2019 | Asterjadhi et al. | |
| 2019/0045571 A1 | 2/2019 | Wu | |
| 2019/0053275 A1 | 2/2019 | Lanante et al. | |
| 2019/0150189 A1 | 5/2019 | Ghosh et al. | |
| 2020/0059973 A1 | 2/2020 | Ahn et al. | |
| 2020/0092881 A1* | 3/2020 | Nezou | H04W 74/0816 |
| 2020/0120711 A1* | 4/2020 | Sevin | H04L 5/001 |
| 2020/0154483 A1 | 5/2020 | Han et al. | |
| 2020/0187186 A1* | 6/2020 | Li | H04W 24/02 |
| 2021/0127427 A1 | 4/2021 | Noh et al. | |
| 2021/0204324 A1* | 7/2021 | Viger | H04W 72/0446 |
| 2021/0345418 A1 | 11/2021 | Asterjadhi et al. | |
| 2022/0322426 A1 | 10/2022 | Mger et al. | |
| 2023/0276302 A1* | 8/2023 | Kanaya | H04W 28/06 370/329 |

FOREIGN PATENT DOCUMENTS

| | | |
|---|---|---|
| EP | 3337269 A1 | 6/2018 |
| GB | 2540450 A | 1/2017 |
| WO | 2012068384 A2 | 5/2012 |
| WO | 2015115983 A1 | 8/2015 |
| WO | 2017005893 A1 | 1/2017 |

OTHER PUBLICATIONS

International Preliminary Report on Patentability—PCT/US2017/026809, The International Bureau of WIPO—Geneva, Switzerland, Oct. 25, 2018.
International Preliminary Report on Patentability—PCT/US2019/046688 The International Bureau of WIPO—Geneva, Switzerland, Mar. 4, 2021.
International Search Report and Written Opinion—PCT/US2017/026809—ISA/EPO—Jul. 21, 2017.
International Search Report and Written Opinion—PCT/US2019/046688—ISA/EPO—Nov. 14, 2019.
Lv K., et al., (ZTE Corp): "TA Address Field in Trigger Frame; 11-15-1389-00-00ax-ta-address-field-in-trigger-frame", IEEE Draft; 11-15-1389-00-00AX-TA-ADDRESS-FIELD-IN-TRIGGER-FRAME, IEEE-SA Mentor, Piscataway, NJ USA, vol. 802. 11ax, Nov. 9, 2015, XP068099379, [retrieved on Nov. 9, 2015], pp. 1-16.
Stacey (Intel) R., et al., "Proposed TGax Draft Specification, IEEE 802.11-16/0024r1, 11-16-0024-01-00ax-proposed draft-specification", IEEE Draft, 11-16-0024-01-00AX-PROPOSED-DRAFT-SPECIFICATION, IEEE P802.11 Wireless LANs (Mar. 2, 2016), IEEE-SA Mentor, Piscataway, NJ, USA, vol. 802.11 ax, No. 1, Mar. 3, 2016 (Mar. 3, 2016), XP068104773, Mar. 3, 2016, pp. 1-160, Section 9.3.1.23, 25.5.2.2, 25.5.2.6, 26.3.12.4, figures 9-51-a, 9-51b, 9-1.
Zhang H., et al., "Broadcast STAID in HE SIG B", IEEE 802.11-15/1352r0, IEEE, Internet URL: https://mentor.ieee.org/802.11/dcn/15/11-15-1352-00-00ax-broadcast-staid-in-he-sig-b.pptx, Nov. 8, 2015, 9 Pages, Nov. 6, 2015.
European Search Report—EP24172333—Search Authority—The Hague—Jul. 16, 2024.

\* cited by examiner

RANDOM ACCESS RESOURCE UNIT ALLOCATION FOR A MULTIPLE BSSID NETWORK

CROSS-REFERENCE TO RELATED APPLICATIONS

This Patent Application is a continuation of U.S. Non-Provisional application Ser. No. 17/375,925 entitled "RANDOM ACCESS RESOURCE UNIT ALLOCATION FOR A MULTIPLE BSSID NETWORK" and filed on Jul. 14, 2021, which is a Continuation Application claiming priority to U.S. patent application Ser. No. 16/106,705 entitled "RANDOM ACCESS RESOURCE UNIT ALLOCATION FOR A MULTIPLE BSSID NETWORK" filed on Aug. 21, 2018, now U.S. Pat. No. 11,083,021, which is a continuation-in-part Application claiming priority to U.S. patent application Ser. No. 15/482,679 entitled "RANDOM ACCESS RESOURCE UNIT ALLOCATION FOR A MULTIPLE BSSID NETWORK" filed on Apr. 7, 2017, now U.S. Pat. No. 10,091,778, which claims priority to U.S. Provisional Patent Application No. 62/322,772 entitled "RANDOM ACCESS RESOURCE UNIT ALLOCATION FOR A MULTIPLE BSSID NETWORK" filed on Apr. 14, 2016, all of which are assigned to the assignee hereof. The disclosures of all prior Applications are considered part of and are incorporated by reference in this Patent Application.

TECHNICAL FIELD

This disclosure relates generally to wireless networks, and specifically to allocating resource units in wireless networks.

DESCRIPTION OF THE RELATED TECHNOLOGY

A wireless local area network (WLAN) may be formed by one or more access points (APs) that provide a shared wireless medium for use by a number of client devices or stations (STAs). Each AP, which may correspond to a Basic Service Set (BSS), may periodically broadcast beacon frames to enable any STAs within wireless range of the AP to establish and maintain a communication link with the WLAN. WLANs that operate in accordance with the IEEE 802.11 family of standards are commonly referred to as Wi-Fi networks.

An AP may create and operate multiple BSSs at the same time, and may assign a number of wireless devices to each of the BSSs. Each of the multiple BSSs may operate independently of each other and yet use the same AP. Because different BSSs may include different numbers of wireless devices, may have different security parameters and access privileges, and may include different types of wireless devices (such as IoT devices, Wi-Fi devices, and so on), it may be desirable for the AP to prioritize the allocation of resources between multiple BSSs.

SUMMARY

The systems, methods and devices of this disclosure each have several innovative aspects, no single one of which is solely responsible for the desirable attributes disclosed herein.

One innovative aspect of the subject matter described in this disclosure can be implemented in a wireless network to prioritize the allocation of resource units (RUs) between multiple basic service sets (BSSs) for uplink data transmissions. In some implementations, an access point (AP) can include one or more processors and a memory storing instructions. The instructions can be executed by the one or more processors to cause the AP to select a number of basic service sets (BSSs), to allocate one or more random-access RUs to each of the selected BSSs, and to transmit, for each of the selected BSSs, a respective frame indicating the random-access RUs allocated to that BSS. The one or more random-access RUs may comprise contention-based resources to be shared only by wireless devices belonging to the selected BSSs. In some aspects, the number of BSSs may be a subset of a plurality of BSSs operated or controlled by the AP.

In some implementations, each of the DL frames may be transmitted on a different RU. However, the random-access RUs allocated to one of the selected BSSs may be different than the RU on which the frame is transmitted for that BSS. In some aspects, the frames may be aggregated in a downlink multi-user physical layer protocol data unit (DL MU PPDU). For example, the subset of RUs on which each of the frames is transmitted may be indicated by an HE-SIG-B field of the DL MU PPDU. In some aspects, each of the MPDUs carried in the BSS-specific RU may include a trigger frame including an association identifier (AID) value of zero indicating random access for STAs associated with that particular BSS.

In some implementations, execution of the instructions by the one or more processors may cause the AP to further allocate additional random-access RUs to the remaining BSSs of the plurality of BSSs and transmit a trigger frame indicating the allocation of additional random-access RUs to the remaining BSSs. In some aspects, the trigger frame may include an AID value of 2047 to indicate random access for STAs associated with any BSS of the set or an AID value corresponding to the index of the BSS to indicate random access for STAs associated with that particular BSS.

In some aspects, the plurality of BSSs may include at least a transmitted BSS and a non-transmitted BSS. Moreover, execution of the instructions by the one or more processors may cause the AP to further allocate additional random-access RUs to the non-transmitted BSS; transmit, via the transmitted BSS, a multi-BSS trigger frame indicating the allocation of additional random-access RUs to the non-transmitted BSS; and receive uplink data, on the additional random access RUs allocated by the multi-BSS trigger frame, from one or more wireless devices belonging to the non-transmitted BSS. For example, in some implementations, the multi-BSS trigger frame may include an AID value corresponding to a BSSID index of the non-transmitted BSS.

Another innovative aspect of the subject matter described in this disclosure can be implemented as a method. The method can include selecting a number of basic service sets (BSSs) from a plurality of BSSs, wherein the selected number of BSSs is a subset of the plurality of BSSs; allocating one or more random-access resource units (RUs) to each of the selected BSSs; and transmitting, for each of the selected BSSs, a respective frame indicating the random-access RUs allocated to that BSS.

Another innovative aspect of the subject matter described in this disclosure can be implemented in a non-transitory computer-readable medium. The non-transitory computer-readable medium can comprise instructions that, when executed by one or more processors of an AP, cause the AP to perform operations including selecting a number of basic service sets (BSSs) from a plurality of BSSs, wherein the selected number of BSSs is a subset of the plurality of BSSs;

allocating one or more random-access resource units (RUs) to each of the selected BSSs; and transmitting, for each of the selected BSSs, a respective frame indicating the random-access RUs allocated to that BSS.

Another innovative aspect of the subject matter described in this disclosure can be implemented in an apparatus. The apparatus can include means for selecting a number of basic service sets (BSSs) from a plurality of BSSs, wherein the selected number of BSSs is a subset of the plurality of BSSs; means for allocating one or more random-access resource units (RUs) to each of the selected BSSs; and means for transmitting, for each of the selected BSSs, a respective frame indicating the random-access RUs allocated to that BSS.

Details of one or more implementations of the subject matter described in this disclosure are set forth in the accompanying drawings and the description below. Other features, aspects, and advantages will become apparent from the description, the drawings and the claims. Note that the relative dimensions of the following figures may not be drawn to scale.

BRIEF DESCRIPTION OF THE DRAWINGS

Like reference numerals refer to corresponding parts throughout the drawing figures.

DETAILED DESCRIPTION

Figure 1A:
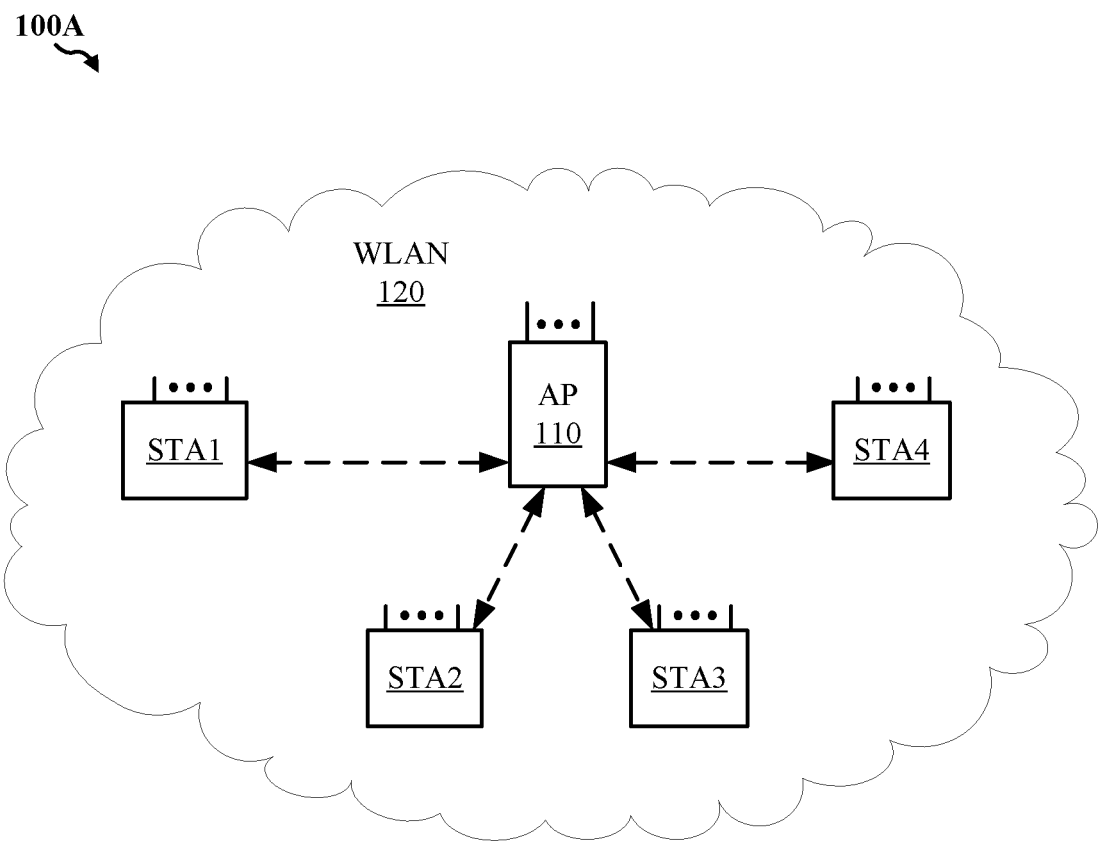
FIG. 1A shows a block diagram of a wireless system within which aspects of the present disclosure may be implemented.

The following description is directed to certain implementations for the purposes of describing the innovative aspects of this disclosure. However, a person having ordinary skill in the art will readily recognize that the teachings herein can be applied in a multitude of different ways. The described implementations may be implemented in any device, system or network that is capable of transmitting and receiving RF signals according to any of the IEEE 16.11 standards, or any of the IEEE 802.11 standards, the Bluetooth® standard, code division multiple access (CDMA), frequency division multiple access (FDMA), time division multiple access (TDMA), Global System for Mobile communications (GSM), GSM/General Packet Radio Service (GPRS), Enhanced Data GSM Environment (EDGE), Terrestrial Trunked Radio (TETRA), Wideband-CDMA (W-CDMA), Evolution Data Optimized (EV-DO), 1xEV-DO, EV-DO Rev A, EV-DO Rev B, High Speed Packet Access (HSPA), High Speed Downlink Packet Access (HSDPA), High Speed Uplink Packet Access (HSUPA), Evolved High Speed Packet Access (HSPA+), Long Term Evolution (LTE), AMPS, or other known signals that are used to communicate within a wireless, cellular or internet of things (IOT) network, such as a system utilizing 3G, 4G or 5G, or further implementations thereof, technology.

Implementations of the subject matter described in this disclosure may be used to prioritize the allocation of resource units (RUs) between multiple basic service sets (BSSs) for uplink (UL) data transmissions. In some implementations, an access point (AP) may prioritize the allocation of random-access RUs to BSSs based on at least one of the security parameters of the plurality of BSSs, access privileges of wireless devices belonging to the plurality of BSSs, types of wireless devices belonging to the plurality of BSSs, quality of service (QoS) parameters of the plurality of BSSs, and delay requirements of wireless devices belonging to the plurality of BSSs. In other implementations, the AP may prioritize the allocation of random-access RUs to a selected BSS (or to a selected number of BSSs) based on a bandwidth of a number of wireless devices belonging to the selected BSS(s).

Particular implementations of the subject matter described in this disclosure can be implemented to realize one or more of the following potential advantages. The ability to allocate random-access RUs to a selected BSS (such as rather than allocating random-access RUs to wireless devices within any or all BSSs controlled or operated by the AP) may increase utilization and efficiency of the wireless medium. For one example, if a first BSS includes 100 wireless devices and a second BSS includes 3 wireless devices, then the AP may allocate more random-access RUs to the first BSS, for example, because more wireless devices belong to the first BSS than to the second BSS. In this manner, the AP may ensure that the 3 wireless devices belonging to the second BSS do not receive a disproportionate share of the random-access RUs (such as compared with conventional resource allocation techniques that may allocate equal amounts of random-access RUs to the first and second BSSs). For another example, if a first BSS includes 4 smartphones that frequently facilitate VoIP calls and a second BSS includes 10 smart sensors, then the AP may allocate more random-access RUs to the first BSS, for example, because the 4 smartphones belonging to the first BSS have higher traffic classes and smaller latency tolerances than the 10 smart sensors belonging to the second BSS.

As used herein, the term "associated STA" refers to a STA that is associated with a given AP, and the term "non-associated STA" refers to a STA that is not associated with the given AP. In addition, as used herein, the term "directed trigger frame" may refer to a trigger frame that directs each of a number of STAs identified in the trigger frame to transmit uplink (UL) multi-user (MU) data on a resource unit allocated to the STA, and the term "random-access trigger frame" may refer to a trigger frame that allows any receiving STA to transmit UL MU data on one or more shared resource units indicated in the trigger frame.

FIG. 1A is a block diagram of a wireless system 100A within which aspects of the present disclosure may be implemented. The wireless system 100A is shown to include four wireless stations STA1-STA4, a wireless access point (AP) 110, and a wireless local area network (WLAN) 120. The WLAN 120 may be formed by a plurality of Wi-Fi access points (APs) that may operate according to the IEEE 802.11 family of standards (or according to other suitable wireless protocols). Thus, although only one AP 110 is shown in FIG. 1A for simplicity, it is to be understood that WLAN 120 may be formed by any number of access points such as AP 110. The AP 110 is assigned a unique media access control (MAC) address that is programmed therein by, for example, the manufacturer of the access point. Similarly, each of stations STA1-STA4 is also assigned a unique MAC address. In some aspects, the AP 110 may assign an association identifier (AID) value to each of the stations STA1-STA4, for example, so that the AP 110 may identify the stations STA1-STA4 using their assigned AID values.

In some implementations, the WLAN 120 may allow for multiple-input multiple-output (MIMO) communications between the AP 110 and the stations STA1-STA4. The MIMO communications may include single-user MIMO (SU-MIMO) and multi-user MIMO (MU-MIMO) communications. In some aspects, the WLAN 120 may utilize a multiple channel access mechanism such as, for example, an orthogonal frequency-division multiple access (OFDMA) mechanism. Although the WLAN 120 is depicted in FIG. 1A as an infrastructure basic service set (BSS), in other implementations, the WLAN 120 may be an independent basic service set (IBSS), an ad-hoc network, or a peer-to-peer (P2P) network (such as operating according to the Wi-Fi Direct protocols).

Each of the stations STA1-STA4 may be any suitable wireless device including, for example, a cell phone, personal digital assistant (PDA), tablet device, laptop computer, or the like. Each of the stations STA1-STA4 may also be referred to as a user equipment (UE), a subscriber station, a mobile unit, a subscriber unit, a wireless unit, a remote unit, a mobile device, a wireless device, a wireless communications device, a remote device, a mobile subscriber station, an access terminal, a mobile terminal, a wireless terminal, a remote terminal, a handset, a user agent, a mobile client, a client, or some other suitable terminology. In some implementations, each of the stations STA1-STA4 may include one or more transceivers, one or more processing resources, one or more memory resources, and a power source (such as a battery). The memory resources may include a non-transitory computer-readable medium (such as one or more nonvolatile memory elements, such as EPROM, EEPROM, Flash memory, a hard drive, etc.) that stores instructions for performing operations described below with respect to FIG. 11.

The AP 110 may be any suitable device that allows one or more wireless devices to connect to a network (such as a local area network (LAN), wide area network (WAN), metropolitan area network (MAN), or the Internet) via the AP 110 using wireless communications such as, for example, Wi-Fi, Bluetooth, and cellular communications. In some implementations, the AP 110 may include one or more transceivers, one or more processing resources, one or more memory resources, and a power source. The memory resources may include a non-transitory computer-readable medium (such as one or more nonvolatile memory elements, such as EPROM, EEPROM, Flash memory, a hard drive, etc.) that stores instructions for performing operations described below with respect to FIG. 11.

For the stations STA1-STA4 and the AP 110, the one or more transceivers may include Wi-Fi transceivers, Bluetooth transceivers, cellular transceivers, and any other suitable radio frequency (RF) transceivers (not shown for simplicity) to transmit and receive wireless communication signals. Each transceiver may communicate with other wireless devices in distinct operating frequency bands, using distinct communication protocols, or both. For example, the Wi-Fi transceiver may communicate within a 900 MHz frequency band, a 2.4 GHz frequency band, a 5 GHz frequency band, and a 60 MHz frequency band in accordance with the IEEE 802.11 standards. The Bluetooth transceiver may communicate within the 2.4 GHz frequency band in accordance with the standards provided by the Bluetooth Special Interest Group (SIG), in accordance with the IEEE 802.15 standards, or both. The cellular transceiver may communicate within various RF frequency bands in accordance with any suitable cellular communications standard.

Figure 1B:
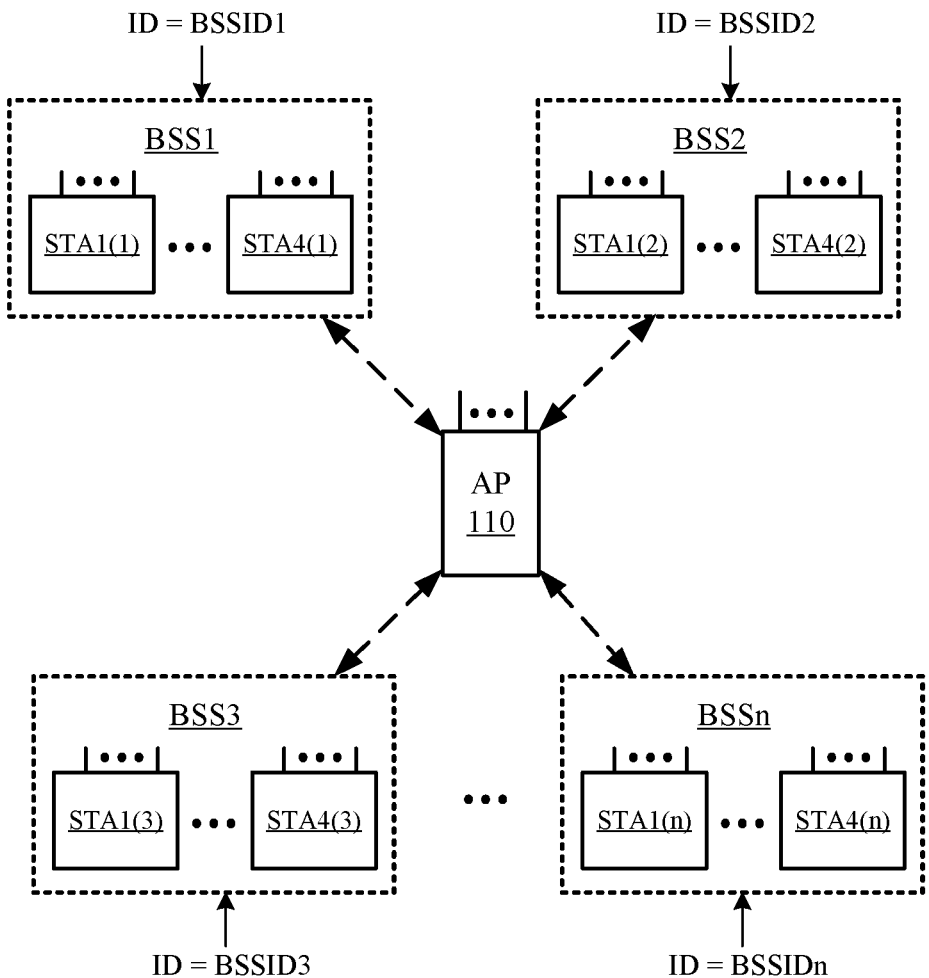
FIG. 1B shows a block diagram of another wireless system within which aspects of the present disclosure may be implemented.

FIG. 1B is a block diagram of another wireless system 100B within which aspects of the present disclosure may be implemented. The wireless system 100B is similar to the wireless system 100A of FIG. 1A, except that the AP 110 of FIG. 1B is depicted as independently operating a plurality of basic service sets BSS1-BSSn. More specifically, for the example of FIG. 1B, the first basic service set BSS1 includes a first set of wireless stations STA1(1)-STA4(1), the second basic service set BSS2 includes a second set of wireless stations STA1(2)-STA4(2), the third basic service set BSS3 includes a third set of wireless stations STA1(3)-STA4(3), and so on, where the $n^{th}$ basic service set BSSn includes an $n^{th}$ set of wireless stations STA1($n$)-STA4($n$). Each of the basic service sets BSS1-BSSn may be assigned a different basic service set identifier (BSSID), for example, so that the AP 110 and each of the sets of wireless stations STA1-STA4 may distinguish between data transmissions associated with each of the different basic service sets BSS1-BSSn. In some implementations, each of the BSSIDs assigned to the basic service sets BSS1-BSSn may be a unique identifier (such as a unique 48-bit identifier). In some aspects, the BSSIDs may be used as a filtering address, for example, so that only the wireless stations STAs associated with a given BSS may receive and decode frames or packets intended for reception by wireless devices belonging to or associated with the given BSS.

As used herein, the term "multi-BSS AP" refers to a physical access point (such as AP 110) or device configured to provide multiple BSSs or virtual local area networks (VLANs), the first basic service set BSS1 may be assigned a first ID denoted herein as "BSSID1," the second basic service set BSS2 may be assigned a second ID denoted herein as "BSSID2," the third basic service set BSS3 may be assigned a third ID denoted herein as "BSSID3," and so on, where the $n^{th}$ basic service set BSSn may be assigned an $n^{th}$ ID denoted herein as "BSSIDn."

It is noted that, providing multiple BSSs through a single AP 110 may be functionally equivalent to having multiple collocated "virtual" APs. If each virtual AP were to broadcast its own management or control frames, a significant portion of the medium access overhead will be consumed by the AP 110. Thus, to prevent the AP 110 from monopolizing the wireless channel, the IEEE 802.11 specification defines a "Multiple BSSID" element (MBE) that may be used to manage communications with each of the plurality of BSSs via a single management or control frame. For example, rather than transmit individual management frames on behalf of each of its associated BSSs, the AP 110 may combine or aggregate BSS information (such as traffic indication map (TIM) information) for multiple BSSs in a single management frame. As used herein, the term "transmitted BSS" refers to any BSS of a multi-BSS AP that supports Multiple BSSID functionality and transmits management or control frames with MBE information, and the term "non-transmitted BSS" refers to any BSS of a multi-BSS AP that supports Multiple BSSID functionality but does not transmit management frames with MBE information.

Figure 2:
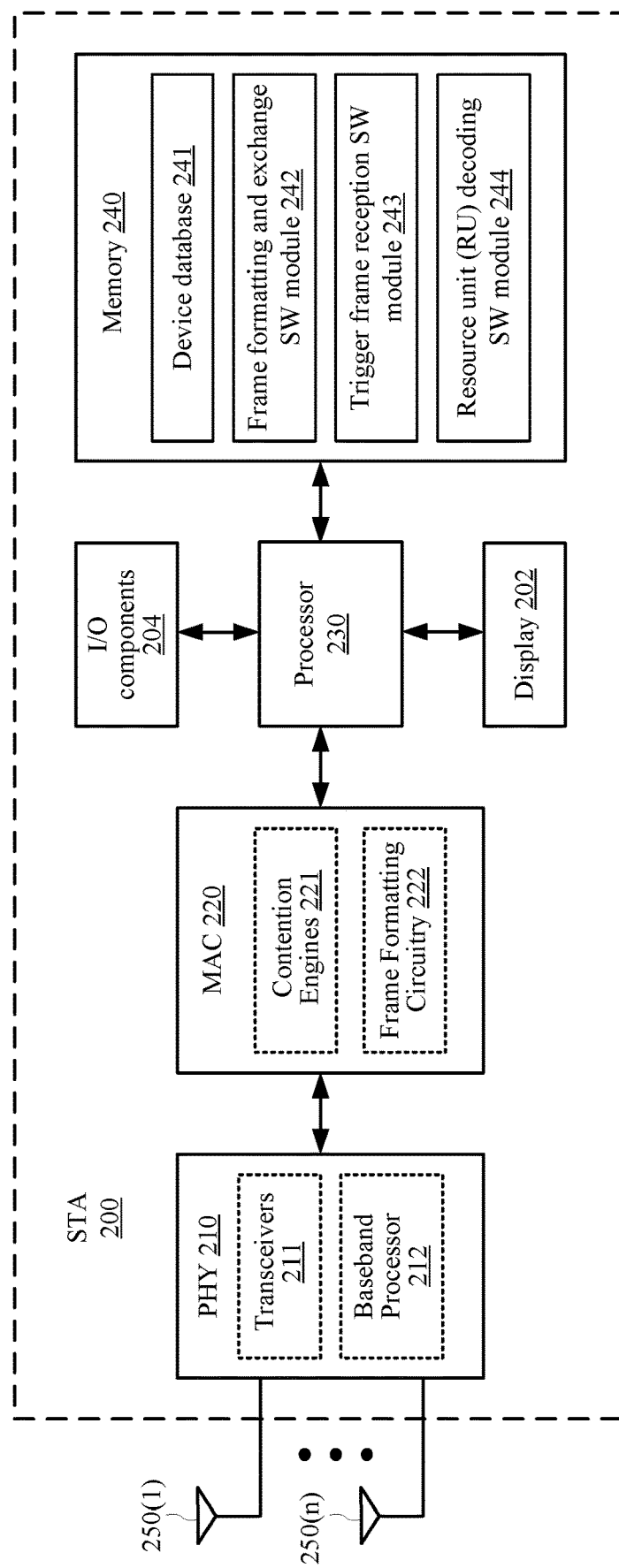
FIG. 2 shows a block diagram of an example wireless station.

FIG. 2 shows an example STA 200. In some implementations, the STA 200 may be one example of one or more of the wireless stations STA1-STA4 of FIG. 1A. In other implementations, the STA 200 may be one example of one or more of the wireless stations STA1-STA4 within each of the BSSs of FIG. 1B. The STA 200 may include a display 202, input/output (I/O) components 204, a physical-layer device (PHY) 210, a MAC 220, a processor 230, a memory 240, and a number of antennas 250(1)-250(n).

The display 202 may be any suitable display or screen upon which items may be presented to a user (such as for viewing, reading, or watching). In some aspects, the display 202 may be a touch-sensitive display that allows for user interaction with the STA 200 and that allows the user to control one or more operations of the STA 200. The I/O components 204 may be or include any suitable mechanism, interface, or device to receive input (such as commands) from the user and to provide output to the user. For example, the I/O components 204 may include (but are not limited to) a graphical user interface, keyboard, mouse, microphone, speakers, and so on.

The PHY 210 may include at least a number of transceivers 211 and a baseband processor 212. The transceivers 211 may be coupled to the antennas 250(1)-250(n), either directly or through an antenna selection circuit (not shown for simplicity). The transceivers 211 may be used to transmit signals to and receive signals from the AP 110 and other STAs (see also FIGS. 1A and 1B), and may be used to scan the surrounding environment to detect and identify nearby access points and other STAs (such as within wireless range of the STA 200). Although not shown in FIG. 2 for simplicity, the transceivers 211 may include any number of transmit chains to process and transmit signals to other wireless devices via the antennas 250(1)-250(n), and may include any number of receive chains to process signals received from the antennas 250(1)-250(n). In some implementations, the STA 200 may be configured for MIMO operations. The MIMO operations may include SU-MIMO operations and MU-MIMO operations. The STA 200 also may be configured for OFDMA communications and other suitable multiple access mechanisms, for example, as may be provided for in the IEEE 802.11ax standards.

The baseband processor 212 may be used to process signals received from the processor 230 or the memory 240 (or both) and to forward the processed signals to the transceivers 211 for transmission via one or more of the antennas 250(1)-250(n), and may be used to process signals received from one or more of the antennas 250(1)-250(n) via the transceivers 211 and to forward the processed signals to the processor 230 or the memory 240 (or both).

The MAC 220 may include at least a number of contention engines 221 and frame formatting circuitry 222. The contention engines 221 may contend for access to one more shared wireless mediums, and may also store packets for transmission over the one more shared wireless mediums. The STA 200 may include one or more contention engines 221 for each of a plurality of different access categories. In other implementations, the contention engines 221 may be separate from the MAC 220. For still other implementations, the contention engines 221 may be implemented as one or more software modules (such as stored in memory 240 or stored in memory provided within the MAC 220) containing instructions that, when executed by the processor 230, perform the functions of the contention engines 221.

The frame formatting circuitry 222 may be used to create and format frames received from the processor 230 (such as by adding MAC headers to PDUs provided by the processor 230), and may be used to re-format frames received from the PHY 210 (such as by stripping MAC headers from frames received from the PHY 210). Although the example of FIG. 2 depicts the MAC 220 coupled to the memory 240 via the processor 230, in other implementations, the PHY 210, the MAC 220, the processor 230, and the memory 240 may be connected using one or more buses (not shown for simplicity).

The processor 230 may be any suitable one or more processors capable of executing scripts or instructions of one or more software programs stored in the STA 200 (such as within the memory 240). In some implementations, the processor 230 may be or include one or more microprocessors providing the processor functionality and external memory providing at least a portion of machine-readable media. In other implementations, the processor 230 may be or include an Application Specific Integrated Circuit (ASIC) with the processor, the bus interface, the user interface, and at least a portion of the machine-readable media integrated into a single chip. In some other implementations, the processor 230 may be or include one or more Field Programmable Gate Arrays (FPGAs) or Programmable Logic Devices (PLDs).

The memory 240 may include a device database 241 that stores profile information for the STA 200 and for a number of other wireless devices such as APs and other STAs. The profile information for the STA 200 may include, for example, its MAC address, the BSSID of the basic service set to which the STA 200 belongs, bandwidth capabilities, supported channel access mechanisms, supported data rates, and so on. The profile information for a particular AP may include, for example, the AP's basic service set identifier (BSSID), MAC address, channel information, received signal strength indicator (RSSI) values, goodput values, channel state information (CSI), supported data rates, connection history with the AP, a trustworthiness value of the AP (such as indicating a level of confidence about the AP's location, etc.), and any other suitable information pertaining to or describing the operation of the AP.

The memory 240 may also include a non-transitory computer-readable medium (such as one or more nonvolatile memory elements, such as EPROM, EEPROM, Flash memory, a hard drive, and so on) that may store at least the following software (SW) modules:

- a frame formatting and exchange software module 242 to facilitate the creation and exchange of any suitable frames (such as data frames, action frames, control frames, and management frames) between the STA 200 and other wireless devices, for example, as described below for one or more operations of FIG. 11;
- a trigger frame reception software module 243 to receive trigger frames, to determine whether the trigger frames solicit a response from the STA 200, and to determine whether the trigger frames allocate any RUs to the STA 200, for example, as described below for one or more operations of FIG. 11; and
- a resource unit (RU) decoding software module 244 to determine which (if any) RUs are allocated to the STA 200, to determine which (if any) RUs are allocated to a BSS with which the STA 200 is associated, to determine whether any random-access RUs are available to the STA 200, and to determine the size, location, and other parameters of any allocated RUs, for example, as described below for one or more operations of FIG. 11.

Each software module includes instructions that, when executed by the processor 230, cause the STA 200 to perform the corresponding functions. The non-transitory computer-readable medium of the memory 240 thus includes instructions for performing all or a portion of the operations described below with respect to FIG. 11.

The processor 230 may execute the frame formatting and exchange software module 242 to facilitate the creation and exchange of any suitable frames (such as data frames, action frames, control frames, and management frames) between the STA 200 and other wireless devices. The processor 230 may execute the trigger frame reception software module 243 to receive trigger frames, to determine whether the trigger frames solicit a response from the STA 200, and to determine whether the trigger frames allocate any RUs to the STA 200. The processor 230 may execute the decoding software module 244 to determine which (if any) RUs are allocated to the STA 200, to determine which (if any) RUs are allocated to a BSS with which the STA 200 is associated or to which the STA 200 belongs, to determine whether any random-access RUs are available to the STA 200, and to determine the size, location, and other parameters of any allocated RUs.

Figure 3:
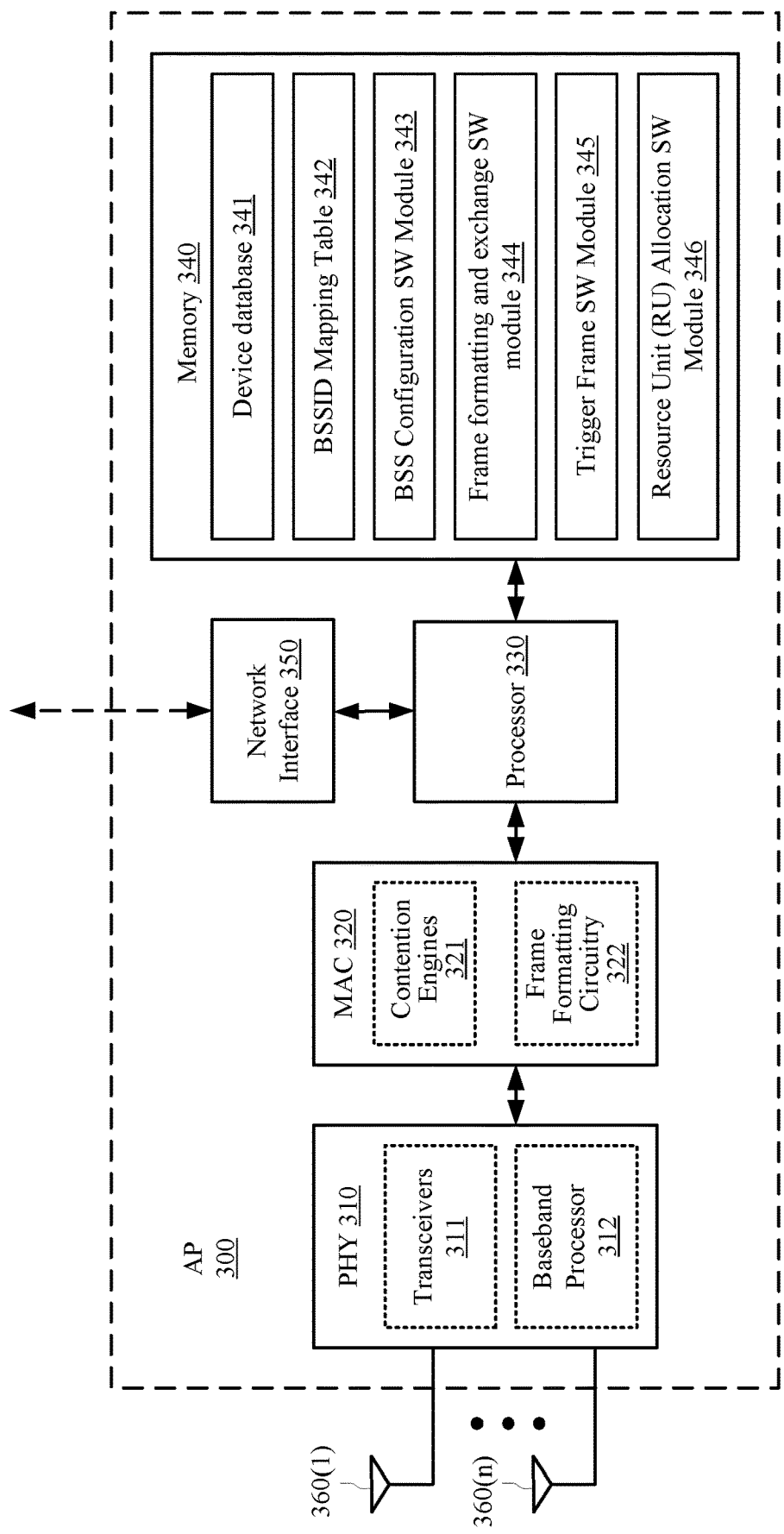
FIG. 3 shows a block diagram of an example access point.

FIG. 3 shows an example AP 300. The AP 300 may be one implementation of the AP 110 of FIGS. 1A and 1B. The AP 300 may include a PHY 310, a MAC 320, a processor 330, a memory 340, a network interface 350, and a number of antennas 360(1)-360(n). The PHY 310 may include at least a number of transceivers 311 and a baseband processor 312. The transceivers 311 may be coupled to the antennas 360(1)-360(n), either directly or through an antenna selection circuit (not shown for simplicity). The transceivers 311 may be used to communicate wirelessly with one or more STAs, with one or more other APs, and with other suitable devices. Although not shown in FIG. 3 for simplicity, the transceivers 311 may include any number of transmit chains to process and transmit signals to other wireless devices via the antennas 360(1)-360(n), and may include any number of receive chains to process signals received from the antennas 360(1)-360(n). In some implementations, the AP 300 may be configured for MIMO operations such as SU-MIMO operations and MU-MIMO operations. The AP 300 also may be configured for OFDMA communications and other suitable multiple access mechanisms, for example, as may be provided for in the IEEE 802.11ax standards.

The baseband processor 312 may be used to process signals received from the processor 330 or the memory 340 (or both) and to forward the processed signals to the transceivers 311 for transmission via one or more of the antennas 360(1)-360(n), and may be used to process signals received from one or more of the antennas 360(1)-360(n) via the transceivers 311 and to forward the processed signals to the processor 330 or the memory 340 (or both).

The network interface 350 may be used to communicate with a WLAN server (not shown for simplicity) either directly or via one or more intervening networks and to transmit signals.

The MAC 320 may include at least a number of contention engines 321 and frame formatting circuitry 322. The contention engines 321 may contend for access to the shared wireless medium, and may also store packets for transmission over the shared wireless medium. In some implementations, the AP 300 may include one or more contention engines 321 for each of a plurality of different access categories. In other implementations, the contention engines 321 may be separate from the MAC 320. For still other implementations, the contention engines 321 may be implemented as one or more software modules (such as stored in the memory 340 or within memory provided within the MAC 320) containing instructions that, when executed by the processor 330, perform the functions of the contention engines 321.

The frame formatting circuitry 322 may be used to create and format frames received from the processor 330 (such as by adding MAC headers to PDUs provided by the processor 330), and may be used to re-format frames received from the PHY 310 (such as by stripping MAC headers from frames received from the PHY 310). Although the example of FIG. 3 depicts the MAC 320 coupled to the memory 340 via the processor 330, in other implementations, the PHY 310, the MAC 320, the processor 330, and the memory 340 may be connected using one or more buses (not shown for simplicity).

The processor 330 may be any suitable one or more processors capable of executing scripts or instructions of one or more software programs stored in the AP 300 (such as within the memory 340). In some implementations, the processor 330 may be or include one or more microprocessors providing the processor functionality and external memory providing at least a portion of machine-readable media. In other implementations, the processor 330 may be or include an Application Specific Integrated Circuit (ASIC) with the processor, the bus interface, the user interface, and at least a portion of the machine-readable media integrated into a single chip. In some other implementations, the processor 330 may be or include one or more Field Programmable Gate Arrays (FPGAs) or Programmable Logic Devices (PLDs).

The memory 340 may include a device database 341 that stores profile information for a plurality of STAs. The profile information for a particular STA may include, for example, its MAC address, supported data rates, connection history with the AP 300, one or more RUs allocated to the STA, the BSS with which the STA is associated or to which the STA belongs, and any other suitable information pertaining to or describing the operation of the STA.

The memory 340 may also include a BSSID mapping table 342 that may store mapping information between AID values and BSSID values, information indicating which wireless devices are part of or belong to each of a number of different BSSs, one or more characteristics or parameters of each of the different BSSs, and any other suitable information pertaining to or describing the operation of one or more BSSs that may be created by, operated by, or otherwise associated with the AP 300.

The memory 340 may also include a non-transitory computer-readable medium (such as one or more nonvolatile memory elements, such as EPROM, EEPROM, Flash memory, a hard drive, and so on) that may store at least the following software (SW) modules:

- a BSS configuration software module 343 to set-up, configure, and operate multiple BSSs and to assign a number of wireless devices to each of the BSSs operated by the AP 300, for example, as described below for one or more operations of FIG. 11;
- a frame formatting and exchange software module 344 to facilitate the creation and exchange of any suitable frames (such as data frames, action frames, control frames, and management frames) between the AP 300 and other wireless devices, for example, as described below for one or more operations of FIG. 11;
- a trigger frame software module 345 to facilitate the transmission of trigger frames to one or more wireless devices, for example, as described below for one or more operations of FIG. 11; and
- a resource unit (RU) allocation software module 346 to allocate a number of dedicated RUs to a number of wireless devices identified by a trigger frame, to allocate a number of random-access RUs to a number of wireless devices that receive a trigger frame, and to allocate one or more random-access RUs to each of a number of selected BSSs, for example, as described below for one or more operations of FIG. 11.

Each software module includes instructions that, when executed by the processor 330, cause the AP 300 to perform the corresponding functions. The non-transitory computer-readable medium of the memory 340 thus includes instructions for performing all or a portion of the operations described below with respect to FIG. 11.

The processor 330 may execute the BSS configuration software module 343 to set-up, configure, and operate multiple BSSs and to assign a number of wireless devices to each of the BSSs operated by the AP 300. The processor 330 may execute the frame formatting and exchange software module 344 to facilitate the creation and exchange of any suitable frames (such as data frames, action frames, control frames, and management frames) between the AP 300 and other wireless devices. The processor 330 may execute the trigger frame software module 345 to facilitate the transmission of trigger frames to one or more wireless devices. The processor 330 may execute the RU allocation software module 345 to allocate a number of dedicated RUs to a number of wireless devices identified by a trigger frame, to allocate a number of random-access RUs to a number of wireless devices that receive a trigger frame, and to allocate one or more random-access RUs to each of the selected BSSs.

The IEEE 802.11ax specification may introduce multiple access mechanisms, such as an orthogonal frequency-division multiple access (OFDMA) mechanism, to allow multiple STAs to transmit and receive data on a shared wireless medium at the same time. For a wireless network using OFDMA, the available frequency spectrum may be divided into a plurality of resource units (RUs) each including a number of different frequency subcarriers, and different RUs may be allocated or assigned (such as by an AP) to different wireless devices (such as STAs) at a given point in time. In this manner, multiple wireless devices may concurrently transmit data on the wireless medium using their assigned RUs or frequency subcarriers.

Figure 4A:
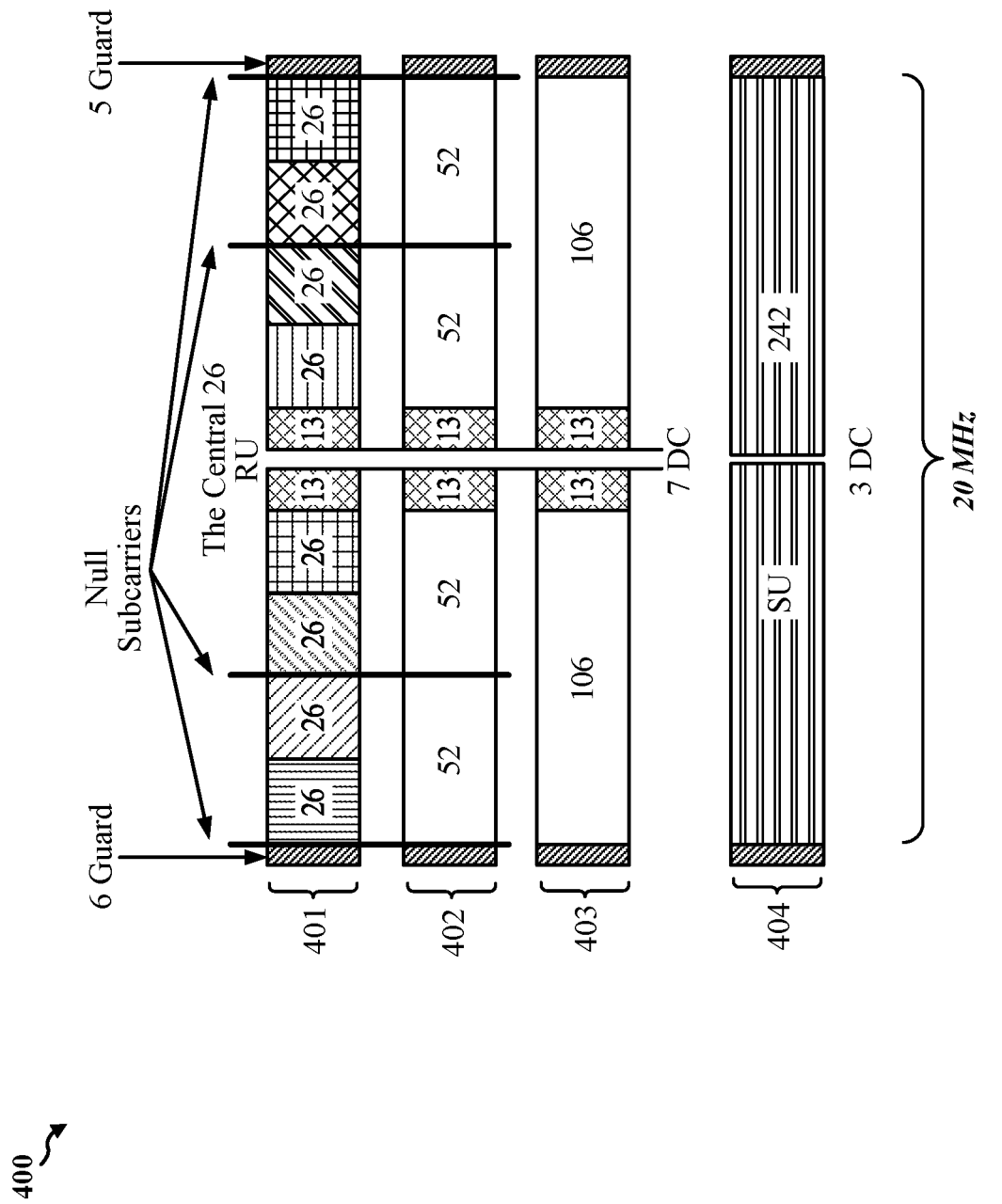
FIG. 4A shows an example subcarrier allocation diagram for a 20 MHz bandwidth.

FIG. 4A shows an example subcarrier allocation diagram 400 for a 20 MHz bandwidth according to the IEEE 802.11ax standards. As shown in FIG. 4A, a 20 MHz bandwidth may be divided into a number of resource units (RUs), and each RU may include a number of subcarriers. In some aspects, a first subcarrier allocation 401 may include a number of RUs each including 26 subcarriers, a second subcarrier allocation 402 may include a number of RUs each including 52 subcarriers, a third subcarrier allocation 403 may include a number of RUs each including 106 subcarriers, and a fourth subcarrier allocation 404 may include one RU including 242 subcarriers. For each of the example subcarrier allocations 401-404 depicted in FIG. 4A, adjacent RUs may be separated by a null subcarrier (such as a DC subcarrier), for example, to reduce leakage between adjacent RUs.

Figure 4B:
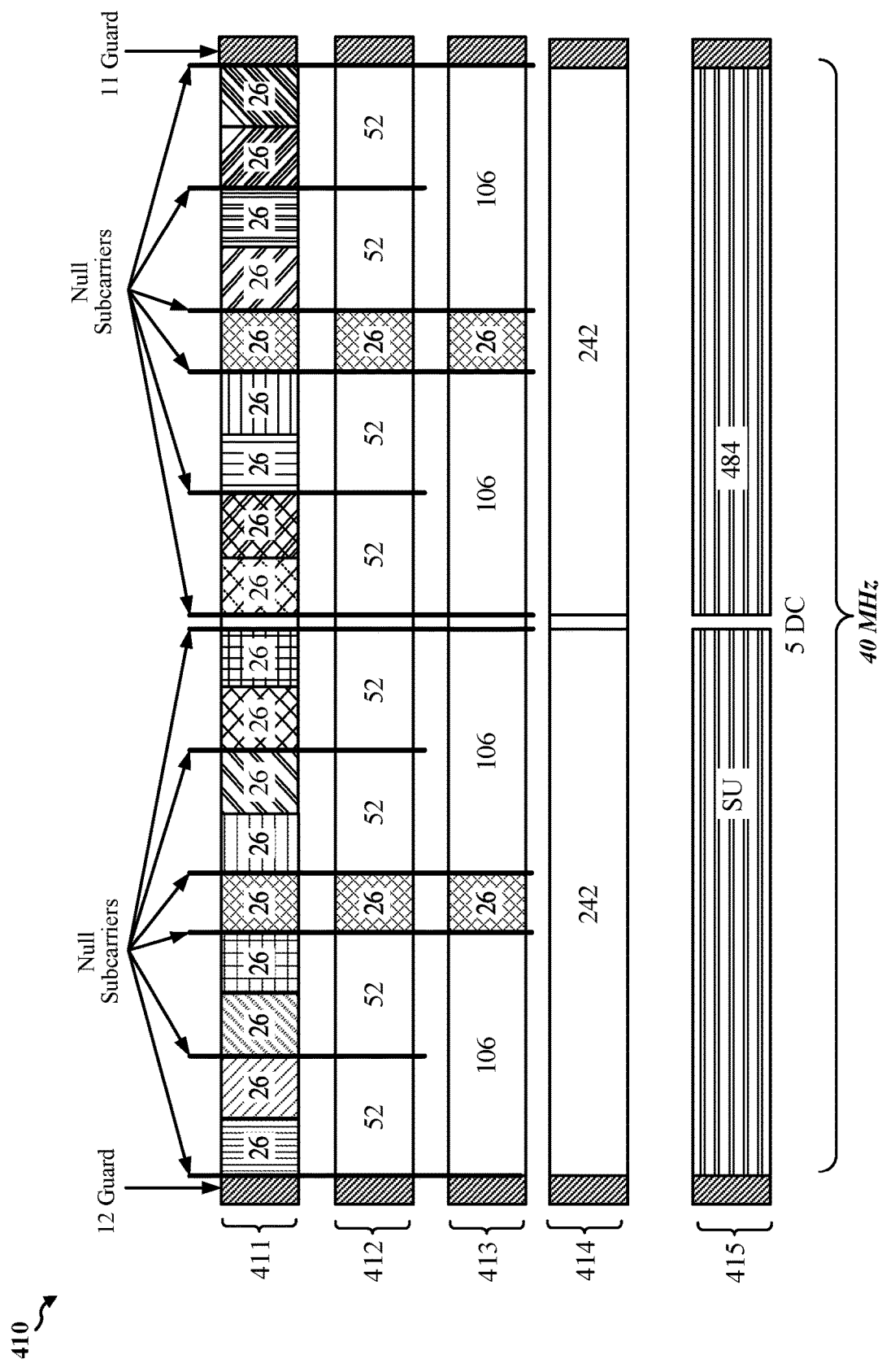
FIG. 4B shows an example subcarrier allocation diagram for a 40 MHz bandwidth.

FIG. 4B shows an example subcarrier allocation diagram 410 for a 40 MHz bandwidth according to the IEEE 802.11ax standards. As shown in FIG. 4B, a 40 MHz bandwidth may be divided into a number of RUs, and each RU may include a number of subcarriers. In some aspects, a first subcarrier allocation 411 may include a number of RUs each including 26 subcarriers, a second subcarrier allocation 412 may include a number of RUs each including 52 subcarriers, a third subcarrier allocation 413 may include a number of RUs each including 106 subcarriers, a fourth subcarrier allocation 414 may include a number of RUs each including 242 subcarriers, and a fifth subcarrier allocation 415 may include one RU including 484 subcarriers. For each of the example subcarrier allocations 411-415 depicted in FIG. 4B, adjacent RUs may be separated by a null subcarrier, for example, to reduce leakage between adjacent RUs.

Figure 4C:
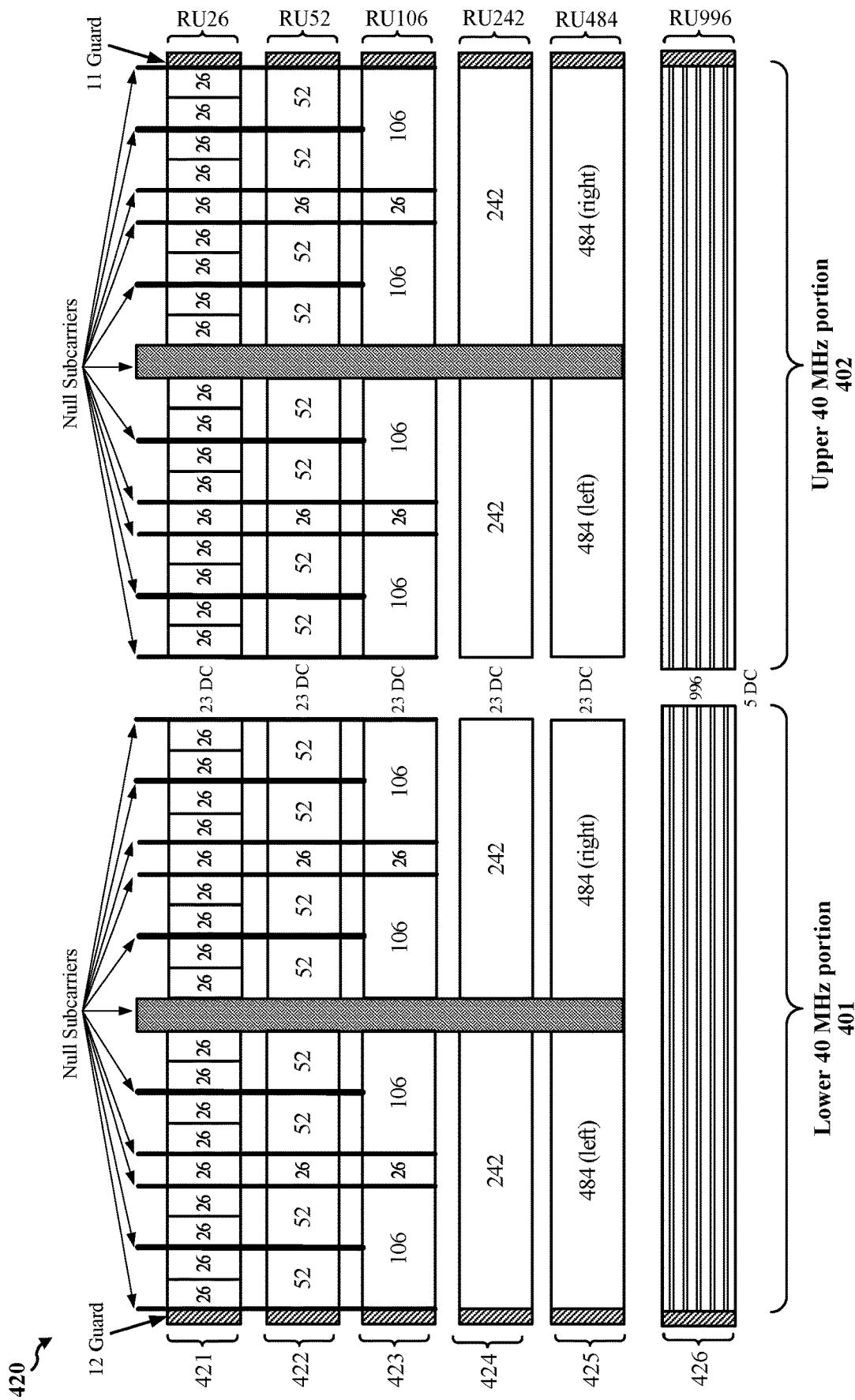
FIG. 4C shows an example subcarrier allocation diagram for an 80 MHz bandwidth.

FIG. 4C shows an example tone map 420 for an 80 MHz bandwidth. The 80 MHz bandwidth may be divided into different numbers of RUs based on the size of the RUs. As shown, the tone map 420 includes six tone plans: a first tone plan 421 includes RUs that span 26 tones, a second tone plan 422 includes RUs that span 52 tones, a third plan 423 includes RUs that span 106 tones, a fourth tone plan 424 includes RUs that span 242 tones, a fifth tone plan 425 includes RUs that span 484 tones, and a sixth tone plan 426 includes an RU that spans 996 tones. The first tone plan 421 includes thirty-six RUs each spanning 26 tones, the second tone plan 422 includes eighteen RUs each spanning 52 tones, the third tone plan 423 includes eight RUs each spanning 106 tones, the fourth tone plan 424 includes four RUs each spanning 242 tones, the fifth tone plan 425 includes two RUs each spanning 484 tones, and the sixth tone plan 426 includes one RU spanning 996 tones (with the left half of the channel for SU operations). Each 26-tone RU includes 24 data subcarriers and 2 pilot subcarriers, each 52-tone RU includes 48 data subcarriers and 4 pilot subcarriers, each 106-tone RU includes 102 data subcarriers and 4 pilot subcarriers, each 242-tone RU includes 234 data subcarriers and 8 pilot subcarriers, each 484-tone RU includes 468 data subcarriers and 16 pilot subcarriers, and the 996-tone RU includes 980 data subcarriers and 16 pilot subcarriers.

Each of the tone plans 421-426 is divided into a lower 40 MHz portion 401 and an upper 40 MHz portion 402. The lower 40 MHz portion 401 and the upper 40 MHz portion 402 of each of the tone plans 421-425 are separated by 23 DC tones, and the lower 40 MHz portion 401 and the upper 40 MHz portion 402 of the tone plan 426 are separated by 5 DC tones. Additionally, the lower 40 MHz portion 401 of each of the tone plans 421-425 is divided into first and second 20 MHz portions separated by 5 null subcarriers, and the upper 40 MHz portion 402 of each of the tone plans 421-425 is divided into third and fourth 20 MHz portions separated by 5 null subcarriers.

An AP may allocate specific or dedicated RUs to a number of associated STAs using a trigger frame. In some implementations, the trigger frame may identify a number of STAs associated with the AP, and may solicit uplink (UL) multi-user (MU) data transmissions from the identified STAs using their allocated RUs. The trigger frame may use association identifier (AID) values, assigned by the AP to its associated STAs, to identify which STAs are to transmit UL data to the AP in response to the trigger frame. In some aspects, the trigger frame may indicate the RU size and location, the modulation and coding scheme (MCS), and the power level for UL transmissions to be used by each of the STAs identified in the trigger frame. As used herein, the RU size may indicate the bandwidth of the RU, and the RU location may indicate which frequency subcarriers are allocated to the RU. A trigger frame that allocates dedicated RUs to a number of associated STAs identified in the trigger frame may be referred to herein as a "directed" trigger frame.

Figure 5A:
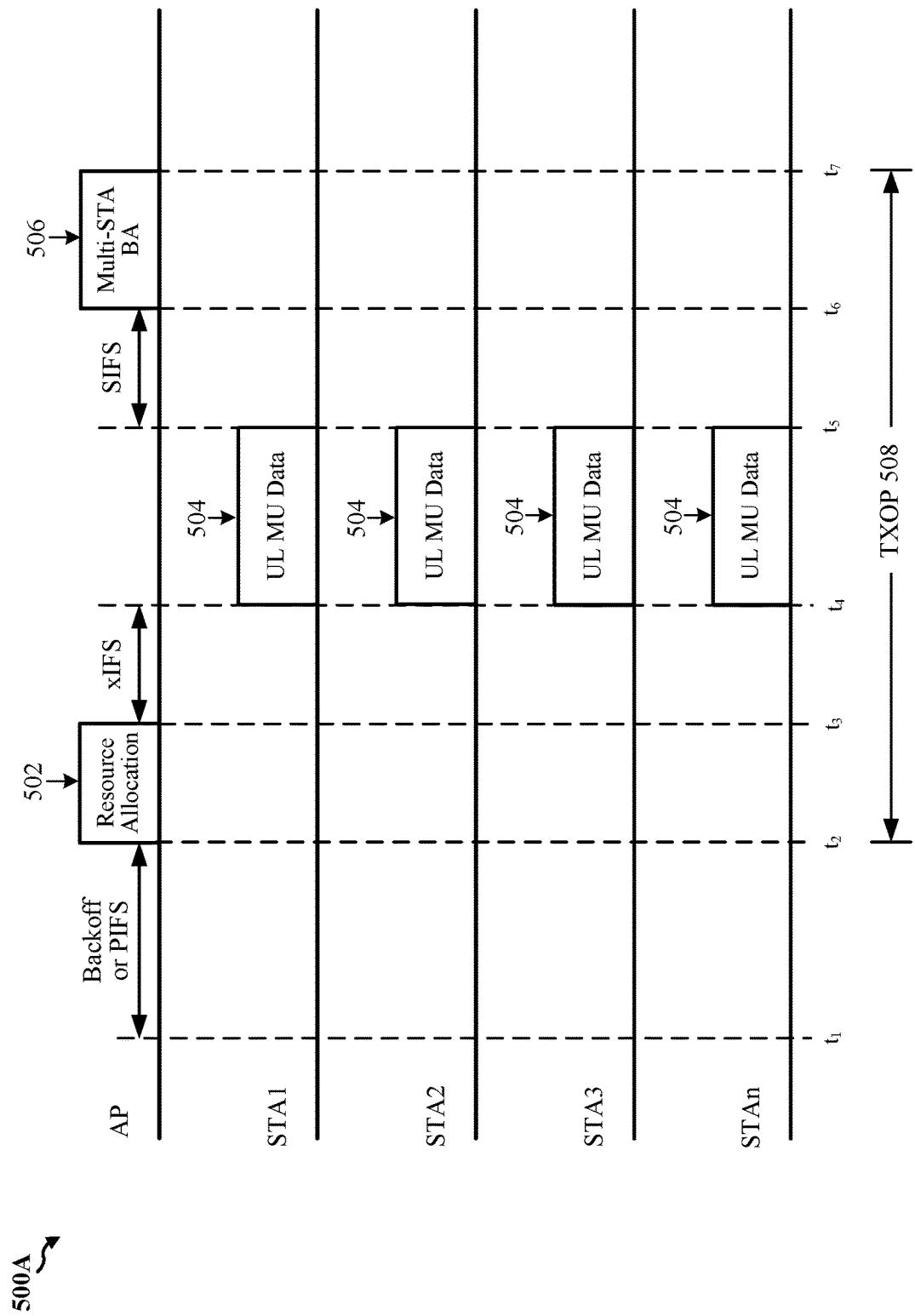
FIG. 5A shows a sequence diagram depicting an example allocation of dedicated resource units (RUs) to a number of wireless stations.

FIG. 5A shows a sequence diagram 500A depicting an example allocation of dedicated resource units (RUs) to a number of wireless stations. The AP of FIG. 5A may be any suitable AP including, for example, the AP 110 of FIG. 1A, the AP 110 of FIG. 1B, or the AP 300 of FIG. 3. Each of the wireless stations STA1-STAn may be any suitable wireless station including, for example, the stations STA1-STA4 of FIG. 1A, the sets of stations STA1-STA4 of FIG. 1B, or the STA 200 of FIG. 2.

In some implementations, the AP may contend for medium access during a backoff period or a point coordination function (PCF) interframe space (PIFS) duration (such as between times $t_1$ and $t_2$). In other implementations, the AP may contend for medium access using another suitable channel access mechanism. In some other implementations, the AP may utilize a multiple channel access mechanism, for example, and may not contend for medium access.

The AP gains access to the wireless medium at time $t_2$, and may transmit a directed resource allocation message 502 to the stations STA1-STAn on a downlink (DL) channel. Time $t_2$ may indicate a beginning of a transmit opportunity (TXOP) 508. The directed resource allocation message 502 may allocate a dedicated RU to each of a number of stations STA1-STA4 identified by the directed resource allocation message 502 for uplink (UL) transmissions. In some aspects, the dedicated RUs allocated by the directed resource allocation message 502 may be unique, for example, so that the stations STA1-STAn may transmit UL data to the AP at the same time (or at substantially the same time). The directed resource allocation message 502 also may solicit UL MU data transmissions from the number of stations STA1-STAn identified by the directed resource allocation message 502.

The stations STA1-STAn may receive the directed resource allocation message 502 at (or around) time $t_3$. Each of the stations STA1-STAn may decode a portion of the directed resource allocation message 502 to determine whether the station is identified by the directed resource allocation message 502. In some aspects, the directed resource allocation message 502 may use AID values assigned to the stations STA1-STAn to identify which of the stations STA1-STAn have been allocated dedicated RUs and to indicate which of the stations STA1-STAn are to transmit UL data based on reception of the directed resource allocation message 502. Each of the stations STA1-STAn that is not identified by the directed resource allocation message 502 may not transmit UL data during the TXOP 508, for example, because they may not have been allocated dedicated RUs for UL transmissions.

Each of the stations STA1-STAn that is identified by the directed resource allocation message 502 may decode additional portions of the directed resource allocation message 502 to determine the size and location of the dedicated RU allocated thereto. In some aspects, the directed resource allocation message 502 may schedule UL data transmissions from the identified stations STA1-STAn to commence at an unspecified interframe spacing (xIFS) duration after reception of the directed resource allocation message 502, for example, as depicted in the example of FIG. 5A.

At time $t_4$, the stations STA1-STAn identified by the directed resource allocation message 502 may begin transmitting UL MU data 504 on their respective dedicated RUs. In some aspects, each of the stations STA1-STAn identified by the directed resource allocation message 502 may determine whether the frequency band associated with its allocated RU has been idle for a duration (such as a PIFS duration) prior to transmitting UL MU data to the AP. For the example of FIG. 5A, all of the stations STA1-STAn are allocated a dedicated RU by the directed resource allocation message 502, and all of the stations STA1-STAn transmit UL MU data to the AP using their respective dedicated RUs. In other implementations, a subset (such as less than all) of the stations STA1-STAn may be allocated dedicated RUs by the directed resource allocation message 502.

The AP may receive the UL MU data 504 from the identified stations STA1-STAn at time $t_5$, and may acknowledge reception of the UL MU data 504 from the stations STA1-STAn by transmitting acknowledgement (ACK) frames at time $t_6$. In some aspects, the AP may acknowledge reception of the UL MU data by transmitting an MU ACK frame to the stations STA1-STAn. In other aspects, the AP may acknowledge reception of the UL MU data by transmitting a multi-station block acknowledgement (M-BA) frame 506 to the stations STA1-STAn, for example, as depicted in FIG. 5A.

As depicted in the example of FIG. 5A, the AP may transmit the M-BA frame 506 a short interframe spacing (SIFS) duration after receiving the UL MU data transmitted from the stations STA1-STAn. In other implementations, the AP may transmit the M-BA frame 506 after another suitable duration.

In addition, or in the alternative, the AP may transmit a resource allocation message that allocates random-access RUs to the stations STA1-STAn for UL data transmissions. In some implementations, the random-access RUs may be contention-based resources that are shared by all STAs that receive the resource allocation message. The random-access RUs may be used by any STA that receives the resource allocation message, including STAs that are not associated with the AP. Allocation of the random-access RUs may allow STAs that were not identified in the directed resource allocation message 502 to transmit UL data to the AP (such as by using the random-access RUs rather than the dedicated RUs allocated by the directed resource allocation message 502). The exclusion of a given STA from UL data transmissions on dedicated RUs allocated by the directed resource allocation message 502 may be based on a variety of factors including, for example, a failure of the AP to receive a buffer status report (BSR) from the given STA, a limited number of dedicated RUs that may be allocated for UL MU data transmissions, or the absence of an AID assigned to the given STA (such as because the given STA is not associated with the AP). A resource allocation message that allocates random-access RUs (such as for OFDMA-based random channel access) to all receiving STAs may be referred to herein as a "wildcard" resource allocation message.

Figure 5B:
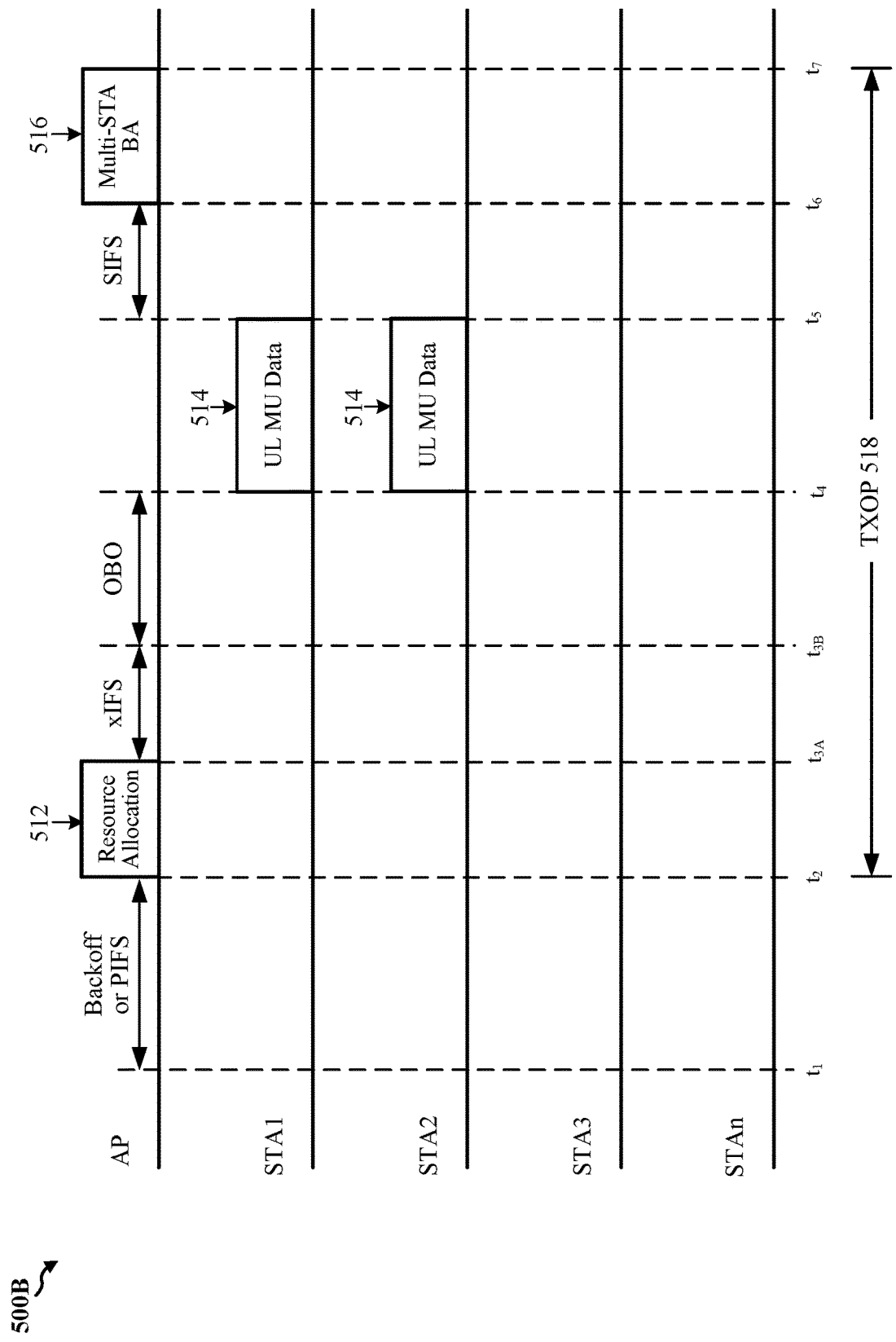
FIG. 5B shows a sequence diagram depicting an example allocation of random-access RUs to a number of wireless stations.

FIG. 5B shows a sequence diagram 500B depicting an example allocation of random-access RUs. The AP of FIG. 5B may be any suitable AP including, for example, the AP 110 of FIG. 1A, the AP 110 of FIG. 1B, or the AP 300 of FIG. 3. Each of the wireless stations STA1-STAn may be any suitable wireless station including, for example, the stations STA1-STA4 of FIG. 1A, the sets of stations STA1-STA4 of FIG. 1B, or the STA 200 of FIG. 2.

In some implementations, the AP may contend for medium access during a backoff period or a PIFS duration. In other implementations, the AP may contend for medium access using another suitable channel access mechanism. In some other implementations, the AP may utilize a multiple channel access mechanism.

The AP gains access to the wireless medium at time $t_2$, and may transmit a wildcard resource allocation message 512 to the stations STA1-STAn on the DL channel. Time $t_2$ may indicate a beginning of a transmit opportunity (TXOP) 518. The wildcard resource allocation message 512 may allocate one or more random-access RUs upon which the stations STA1-STAn may transmit UL MU data to the AP. The stations STA1-STAn may receive the wildcard resource allocation message 512 at (or around) time $t_{3A}$, and may contend with each other for access to the allocated random-access RUs at time $t_{3B}$ (which may be an xIFS duration after time $t_{3A}$). In some aspects, the wildcard resource allocation message 512 may be a broadcast frame that allows any receiving wireless device to contend for access to the random-access RUs allocated by the wildcard resource allocation message 512. In other aspects, the wildcard resource allocation message 512 may be a multicast frame that allows a selected subset of the stations STA1-STAn to contend for access to the random-access RUs allocated by the wildcard resource allocation message 512.

In some implementations, the stations STA1-STAn may use the DCF or PCF back-off procedure to contend for access to the random-access RUs. In other implementations, the stations STA1-STAn may use an opportunistic back-off (OBO) procedure to contend for access to the random-access RUs, for example, as depicted in the example of FIG. 5B. The OBO procedure is a distributed random channel access mechanism for which each STA selects a random back-off number that may be used to select one of the random-access RUs allocated by the wildcard resource allocation message 512. For example, if the AP allocates four random-access RUs to be shared as contention-based resources, and a given STA selects an OBO value of 3, then the given STA may transmit UL MU data using the third random-access RU. Conversely, if the given STA selects an OBO value of 5, then the given STA may not use the random-access RUs to transmit UL data during the TXOP 518 (such as because the four random-access RUs may be used by STAs that selected OBO values of 1 through 4). After expiration of the TXOP 518, the given STA may update its OBO value from 5 to 1, and then transmit UL MU data using the first random-access RU during a next TXOP.

For the example of FIG. 5B, stations STA1 and STA2 gain access to the random-access RUs allocated by the wildcard resource allocation message 512 at time $t_4$, and begin transmitting UL MU data 514 to the AP during the TXOP 518. The other stations (such as stations STA3-STAn) may not use the random-access RUs allocated by the wildcard resource allocation message 512 to transmit UL data during the TXOP 518, for example, because their initial OBO values may be greater than the number of random-access RUs allocated by the wildcard resource allocation message 512.

The AP may receive the UL MU data 514 from stations STA1 and STA2 at time $t_5$, and may acknowledge reception of the UL MU data 514 by transmitting acknowledgement (ACK) frames at time $t_6$. In some aspects, the AP may acknowledge reception of the UL MU data 514 by transmitting an MU ACK frame to stations STA1 and STA2. In other aspects, the AP may acknowledge reception of the UL MU data 514 by transmitting a multi-station block acknowledgement (M-BA) frame 516 to stations STA1 and STA2, for example, as depicted in FIG. 5B.

Referring again to FIG. 1B, the AP 110 may create and independently operate a plurality of basic service sets BSS1-BSSn, and each of the basic service sets BSS1-BSSn may include a number of wireless devices (such as the corresponding sets of stations STA1-STA4). In some implementations, the AP 110 may assign each of the example stations (STAs) shown in FIG. 1B to a particular one of the basic service sets BSS1-BSSn based on a number of parameters of one or more of the basic service sets BSS1-BSSn. In some aspects, the number of parameters of a given one of the basic service sets BSS1-BSSn may include one or more of: security parameters of the given BSS, access privileges of the wireless devices associated with or belonging to the given BSS, the types of wireless devices (such as IoT devices, Wi-Fi devices, and so on) associated with or belonging to the given BSS, quality of service (QoS) parameters of the given BSS, delay requirements (such as relatively short delays for voice traffic and relatively long delays for background or best effort traffic) of the wireless devices associated with or belonging to the given BSS, bandwidth capabilities of the wireless devices associated with or belonging to the given BSS (such as narrowband capabilities and wideband capabilities), and any other suitable metric or characteristic that may be used to prioritize the allocation of random-access RUs to the plurality of basic service sets BSS1-BSSn.

Figure 5C:
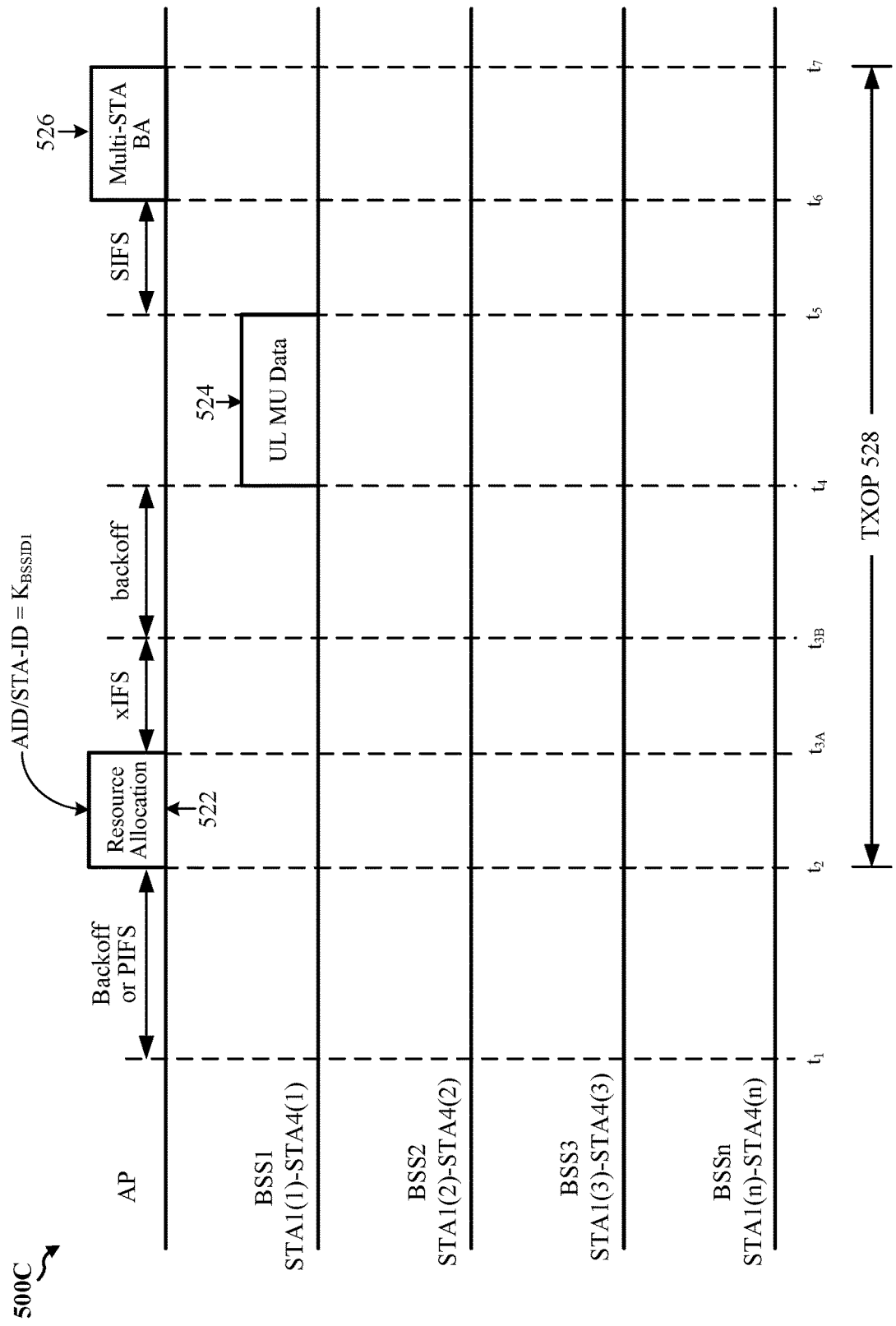
FIG. 5C shows a sequence diagram depicting an example allocation of random-access RUs to a selected basic service set (BSS).

FIG. 5C shows a sequence diagram 500C depicting an example allocation of random-access RUs to a specific basic service set (BSS). The AP of FIG. 5C may be any suitable AP including, for example, the AP 110 of FIG. 1A, the AP 110 of FIG. 1B, or the AP 300 of FIG. 3. In some aspects, the basic service sets BSS1-BSSn shown in FIG. 5C may be examples of the basic service sets BSS1-BSSn of FIG. 1B. In other aspects, the basic service sets BSS1-BSSn shown in FIG. 5C may be other suitable basic service sets. Although not shown for simplicity, each of the basic service sets BSS1-BSSn shown in FIG. 5C may include or be associated with a number of wireless devices (such as the STAs of FIG. 1A, the sets of STAs of FIG. 1B, the STA 200 of FIG. 2, or any other suitable wireless devices capable of wirelessly communicating with the AP.

In some implementations, the AP may contend for medium access during a backoff period or a point coordination function (PCF) interframe space (PIFS) duration (such as between times $t_1$ and $t_2$). In other implementations, the AP may contend for medium access using another suitable channel access mechanism. In some other implementations, the AP may utilize a multiple channel access mechanism, for example, and may not contend for medium access.

The AP gains access to the wireless medium at time $t_2$, and may transmit a resource allocation message 522 to the sets of stations STA1-STAn belonging to respective basic service sets BSS1-BSSn on a DL channel. Time $t_2$ may indicate a beginning of a transmit opportunity (TXOP) 528. The resource allocation message 522 may allocate one or more random-access RUs to each of a selected number of the plurality of basic service sets BSS1-BSSn, for example, so that the wireless devices associated with or belonging to the selected BSSs may transmit UL data to the AP (or to other devices) using the random-access RUs allocated by the resource allocation message 522. In some implementations, the resource allocation message 522 may contain one or more values identifying the selected BSSs, and may indicate the size and location of the random-access RUs allocated to each of the selected BSSs. In some aspects, each of the values may correspond to an AID, within a trigger frame, having a value set to the BSSID of a corresponding one of the selected BSSs. In some other aspects, each of the values may correspond to a station identifier (STA-ID), within a preamble of a downlink multi-user physical layer protocol data unit (DL MU PPDU), having a value set to the BSSID of a corresponding one of the selected BSSs. Thus, rather than identifying a particular wireless station to which one or more random-access RUs are allocated, each AID or STA-ID provided in the resource allocation message 522 may identify a particular BSS to which one or more random-access RUs are allocated. The selected number of BSSs may be a subset of the BSSs operated or controlled by the AP, for example, so that the random-access RUs allocated by the AP are not available to all BSSs operated or controlled by the AP.

In some aspects, the resource allocation message 522 may be a broadcast frame that allows any wireless devices associated with or belonging to the selected BSSs to contend for access to the random-access RUs allocated by the resource allocation message 522. In other aspects, the resource allocation message 522 may be a multicast frame that allows a group of wireless devices associated with or belonging to the selected BSSs to contend for access to the random-access RUs allocated by the resource allocation message 522. Still further, in some aspects, the resource allocation message 522 may be a DL MU PPDU that contains a plurality of (aggregated) frames. For example, each of the frames may be associated with a respective one of the selected BSSs.

The wireless devices within range of the AP 110 may receive the resource allocation message 522 at (or around) time $t_{3A}$. Each of the wireless devices that receives the resource allocation message 522 may decode the AID or STA-ID value included in the resource allocation message 522 to determine whether the BSS to which the wireless device belongs is selected for an allocation of random-access RUs. In some implementations, if a given wireless device determines that the AID value included in the resource allocation message 522 matches the BSSID of its BSS, then the given wireless device may contend for access to the random-access RUs allocated by the resource allocation message 522. Conversely, if a given wireless device determines that the AID or STA-ID value included in the resource allocation message 522 does not match the BSSID of its BSS, then the given wireless device may not contend for access to the random-access RUs allocated by the resource allocation message 522.

For the example of FIG. 5C, the AP 110 selects the first basic service sets BSS1 for allocation of the random-access RUs, and the AID or STA-ID value stored in the resource allocation message 522 is set to a value (K) representing the BSSID of the first basic service set BSS1 (such as AID/STA-ID=$K_{BSSID1}$). Because the stations STA1(1)-STA4(1) belong to the first basic service set BSS1, the stations STA1(1)-STA4(1) may contend with each other for access to the random-access RUs allocated by the resource allocation message 522 at time $t_{3B}$ (which may be an xIFS duration after time $t_{3A}$). Stations that do not belong to the selected BSS may not contend for access to the random-access RUs allocated by the resource allocation message 522. Thus, because the sets of stations STA1(2)-STA4(2) through STA1(n)-STA4(n) belong to non-selected basic service sets BSS2 through BSSn, respectively, these sets of stations may not contend for access to the random-access RUs allocated by the resource allocation message 522. In some aspects, stations that do not belong to the selected BSS may return to a power save state.

The first station STA1(1) of the selected basic service set BSS1 is depicted as gaining access to the wireless medium (after a backoff period between times $t_{3B}$ and $t_4$), and may begin transmitting UL data on the random-access RU allocated by the resource allocation message 522 at time $t_4$. In some aspects, the first station STA1(1) may use the random-access RU to transmit UL data within first basic service set BSS1. In other aspects, the first station STA1(1) may use the random-access RU to transmit UL data to wireless devices belonging to other basic service sets.

The AP may receive the UL MU data 524 from the first station STA1(1) at time $t_5$, and may acknowledge reception of the UL MU data 524 by transmitting an ACK frame to the first station STA1(1) at time $t_6$. In some aspects, the AP may acknowledge reception of the UL MU data 524 by transmitting an MU ACK frame to the first station STA1(1). In other aspects, the AP may acknowledge reception of the UL MU data 524 by transmitting a multi-station block acknowledgement (M-BA) frame 526 to the first station STA1(1), for example, as depicted in FIG. 5C.

Allocating random-access RUs to a selected BSS (such as rather than allocating random-access RUs to wireless devices within any or all BSSs controlled or operated by the AP) may increase medium utilization and efficiency. For one example, if a first BSS includes 100 wireless devices and a second BSS includes 3 wireless devices, then allocating random-access RUs to all wireless devices associated with the AP may result in the wireless devices belonging to the second BSS receiving a disproportionate share of the random-access RUs allocated by the AP. Thus, by allocating random-access RUs to wireless devices belonging to the first BSS (rather than to wireless devices belonging to all BSSs operated or controlled by the AP), the AP may prioritize the allocation of random-access RUs based on the number of wireless devices that belong to the first BSS. In other words, because more wireless devices belong to the first BSS than to the second BSS, the AP may allocate more random-access RUs to the first BSS than to the second BSS (or may allocate random-access RUs to the first BSS more frequently than to the second BSS).

For another example, if a first BSS includes 4 smartphones that frequently implement VoIP calls and a second BSS includes 10 IoT devices (such as smart sensors), then allocating random-access RUs to all wireless devices associated with the AP using conventional RU allocation techniques may result in allocations of random-access RUs to sensor devices (which typically do not have delay-critical traffic) that would otherwise be available to facilitate VoIP calls and other real-time traffic corresponding to the first BSS. Thus, by allocating random-access RUs to the 4 smartphones belonging to the first BSS (and not to the 10 IoT devices belonging to the second BSS), the AP may prioritize the allocation of random-access RUs based on traffic classes and delay or latency requirements.

In some implementations, the resource allocation message used to allocate random-access RUs to selected BSSs may correspond to a multi-BSS trigger frame. For example, a multi-BSS trigger frame may be a trigger frame sent by a transmitted BSS on behalf of each BSS provided by the AP (including the transmitted BSS and any non-transmitted BSSs). More specifically, the multi-BSS trigger frame may indicate the allocation of random-access (or dedicated) RUs to STAs associated with each of the selected BSSs. However, aspects of the present disclosure recognize that some STAs may not support the multi-BSS extension to control frames and may therefore be unable to receive or decode the multi-BSS trigger frame. Thus, in some other implementations, the resource allocation message may comprise one or more trigger frames, where each trigger frame is associated with a respective one of the selected BSSs. For example, each trigger frame may be signaled on a respective RU, of a DL MU PPDU. More specifically, upon receiving a trigger frame, the recipient STA may identify one or more RUs (such as random-access RUs) to be used for UL transmissions to the corresponding BSS. In some aspects, a plurality of trigger frames may be aggregated or otherwise combined in a DL MU PPDU (such as defined by the IEEE 802.11ax specification).

Figure 6A:
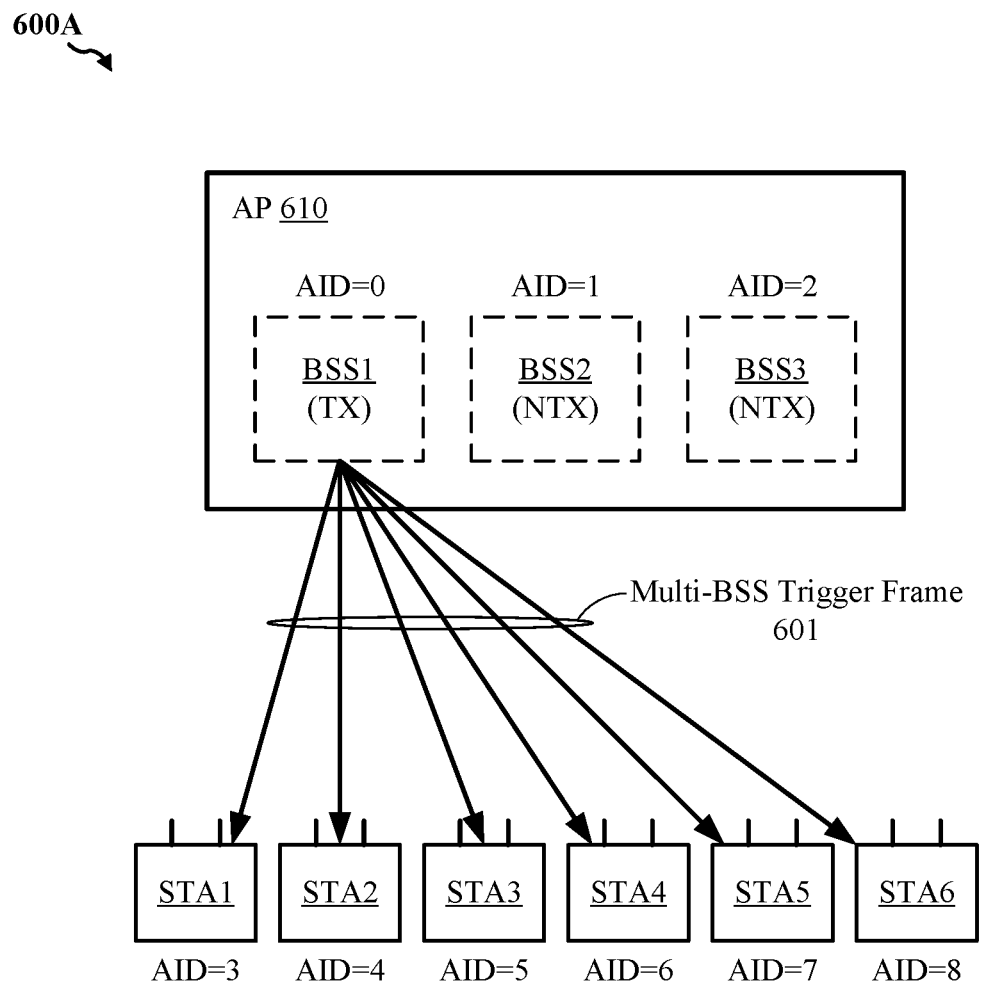
FIG. 6A shows an example Multiple BSSID wireless system in which RUs may be allocated using a multi-BSS trigger frame.

FIG. 6A shows an example Multiple BSSID wireless system 600A in which RUs may be allocated using a multi-BSS trigger frame. The system 600A includes an AP 610 and a number of wireless stations STA1-STA6. In the example of FIG. 6A, the AP 610 is a multi-BSS AP serving as three Basic Service Sets BSS1-BSS3 Further, in the example of FIG. 6A, the wireless stations STA1-STA6 may each support the multi-BSS extension to control frames. Thus, the AP 610 may transmit a single multi-BSS control (or management) frame to the wireless stations STA1-STA6 on behalf of multiple BSSs. For example, the multi-BSS control frame may correspond to a trigger frame used for soliciting and allocating resources for uplink transmissions by one or more of the wireless stations STA1-STA6.

In the example of FIG. 6A, BSS1 may be a transmitted (TX) BSS whereas BSS2 and BSS3 are non-transmitted (NTX) BSSs. Accordingly, BSS1 may transmit control (or management) frames on behalf of one or more of the Basic Service Sets BSS1, BSS2, or BSS3. In some implementations, BSS2 and BSS3 may not transmit any control (or management) frames. Thus, access to BSS2 and BSS3 may be managed through BSS1. More specifically, the control (or management) frames transmitted by BSS1 may include aggregated BSSID information for multiple BSSs (including BSS1, BSS2, or BSS3).

Trigger or control frames are typically used to control access to a single BSS (such as the BSS that transmitted the control frame). For example, a conventional control frame may include a transmitter address (TA) field specifying the address of a particular BSS, and a receiver address (RA) field specifying the address of a recipient STA associated with the particular BSS or a broadcast address (when targeting multiple STAs associated with the BSS). In contrast, a multi-BSS control frame (which may include trigger frames, null data packet announcement (NDPA) frames, multi-STA block acknowledgement (BA) frames, multi-user request to send (RTS) frames, and the like) may be directed to multiple STAs that may be associated with different BSSs. For example, the multi-BSS control frame may include multiple User Information fields that may be used to provide information for multiple BSSs. The TA field of a multi-BSS control frame may specify the address of the TX BSS (regardless of which BSSs are implicated in the User Information fields), and the RA field of the multi-BSS control frame may specify a broadcast address or a "common address" representing all BSSs of the multi-BSS AP. In some aspects, the address of the TX BSS (such as BSS1) may be used as the common address for addressing STAs belonging to multiple BSSs.

In some implementations, the TX BSS (BSS1) may be configured to transmit a multi-BSS trigger frame 601 indicating RU allocations for one or more of the wireless stations STA1-STA6 or Basic Service Sets BSS1-BSS3. For example, the multi-BSS trigger frame 601 may correspond to any of the resource allocation messages 502, 512, or 522 described above with respect to FIGS. 5A-5C. In some implementations, the multi-BSS trigger frame 601 may contain one or more values identifying one or more of the Basic Service Sets BSS1-BSS3, and may indicate the size and location of the RUs allocated to each of the BSSs. In some aspects, each of the values may correspond to an AID having a value set to the BSSID of a corresponding one of the selected BSSs (as described in greater detail with respect to FIGS. 8-9B).

Figure 6B:
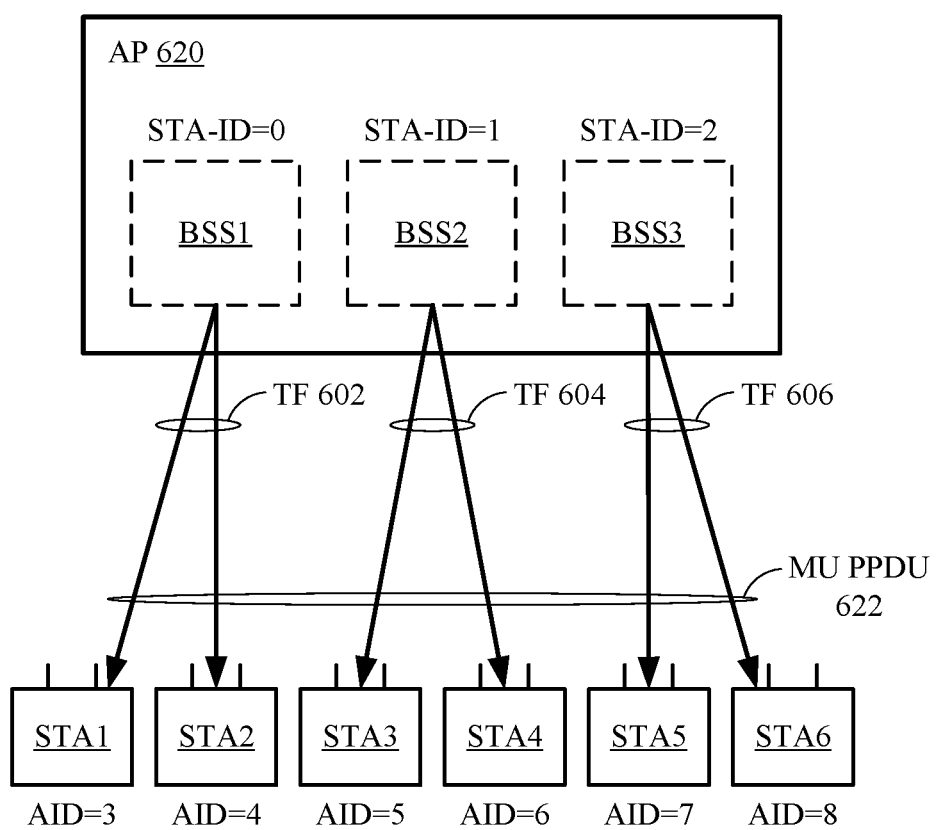
FIG. 6B shows an example Multiple BSSID wireless system in which RUs may be allocated using respective trigger frames for each BSS.

The wireless stations STA1-STAG may receive the multi-BSS trigger frame 601 transmitted by BSS1. Each of the STAs may determine that the multi-BSS trigger frame 601 is transmitted by the TX BSS, for example, by identifying the address of BSS1 in the TA field of the control frame 601. Upon determining that the multi-BSS trigger frame 601 is transmitted by the TX BSS, each of the wireless stations STA1-STA6 may then determine whether it is a recipient of an allocation of RUs. For example, each STA may determine whether the multi-BSS trigger frame 601 contains an AID value corresponding to the BSSID of its associated BSS. In the example of FIG. 6BA, each of the Basic Service Sets BSS1-BSS3 may be assigned a respective AID value 0-2 and each of the wireless stations STA1-STAG may be assigned a respective AID value 3-8. In some aspects, the STA may determine its RU allocation based on the RU information associated with the AID value provided in the multi-BSS trigger frame 601. Accordingly, each of the wireless stations STA1-STAG may decode the AID value(s) included in the multi-BSS trigger frame 601 to determine its RU allocation (if any).

As noted above, some STAs may not support the multi-BSS extension to control frames and may therefore be unable to receive the multi-BSS trigger frame 601 sent by the TX BSS (BSS1). For example, a STA may indicate that it does not support the multi-BSS extension to control frames by disabling a bit (such as by setting the bit value to zero) in the HE capabilities element of uplink communication frames sent to the multi-BSS AP 610. In some implementations, the multi-BSS AP 610 may refrain from sending multi-BSS control frames to any STAs that have indicated they do not support Multiple BSSID functionality in this manner.

FIG. 6B shows an example Multiple BSSID wireless system 600B in which RUs may be allocated using respective trigger frames for each BSS. The system 600B includes an AP 620 and a number of wireless stations STA1-STAG. In the example of FIG. 6B, the AP 620 is a multi-BSS AP serving as three Basic Service Sets BSS1-BSS3. However, in the example of FIG. 6B, the wireless stations STA1-STA6 may not support the multi-BSS extension to control frames. Thus, the AP 610 may transmit individual control frames on behalf of each of the Basic Service Sets BSS1, BSS2, and BSS3, respectively. For example, one or more of the control frames may correspond to a trigger frame used for soliciting and allocating resources for uplink transmissions by one or more of the wireless stations STA1-STAG.

In the example of FIG. 6B, each of the Basic Service Sets BSS1-BSS3 may be configured to transmit trigger frames (TF) 602-606, respectively, to its associated STAs. For example, STA1 and STA2 may be associated with BSS1, STA3 and STA4 may be associated with BSS2, and STA5 and STAG may be associated with BSS3. In some aspects, at least one of the BSSs may be a transmitted BSS and at least one of the BSSs may be a non-transmitted BSS. It is noted that, while a non-transmitted BSS may not broadcast beacon frames, non-transmitted BSSs may still transmit control frames (such as ACK frames, RTS frames, CTS frames, and the like) and other management frames (such as probe response frames, authentication frames, association frames, and the like). However, in some other aspects, each of the Basic Service Sets BSS1-BSS3 may be a transmitted BSS.

In some implementations, each of the trigger frames 602-606 may indicate RU allocations for the corresponding BSS (such as Basic Service Sets BSS1-BSS3, respectively). In some implementations, each of the trigger frames 602-606 may contain one or more values identifying the corresponding BSS or one or more of its associated STAs, and may indicate the size and location of the RUs allocated to the corresponding BSS or the associated STAs. In some aspects, each of the values may correspond to an AID having a value set to zero (for the corresponding BSS) or the AID value assigned to a particular STA (as described in greater detail with respect to FIGS. 7-10). Still further, in some aspects, each of the trigger frames 602-606 may be transmitted on the RUs allocated to the corresponding BSS. In some implementations, to prevent the Basic Service Sets BSS1-BSS3 from monopolizing the wireless channel, the trigger frames 602-606 may be combined or aggregated into a MU PPDU 622 transmission by the AP 620. For example, the MU PPDU 622 may correspond to any of the resource allocation messages 502, 512, or 522 described above with respect to FIGS. 5A-5C.

The wireless stations STA1-STA6 may receive the MU PPDU 622 transmitted by the AP 620. Upon receiving the MU PPDU 622, each of the STAs may determine whether it is a recipient of an allocation of RUs. For example, each STA may determine whether the DL MU PDDU 662 contains a STA-ID value corresponding to its assigned AID value or the BSSID of its associated BSS. In the example of FIG. 6B, each of the Basic Service Sets BSS1-BSS3 may be assigned a respective STA-ID value 0-2 and each of the wireless stations STA1-STA6 may be assigned a respective AID value 3-8. In some aspects, the STA-ID value may point to a trigger frame for the corresponding BSS provided in a data field of the MU PPDU 622. More specifically, the STA-ID value may indicate or otherwise correspond with an RU on which the trigger frame is transmitted. The STA may retrieve the trigger frame on the RU assigned to the STA-ID value for itself or its associated BSS.

Figure 7:
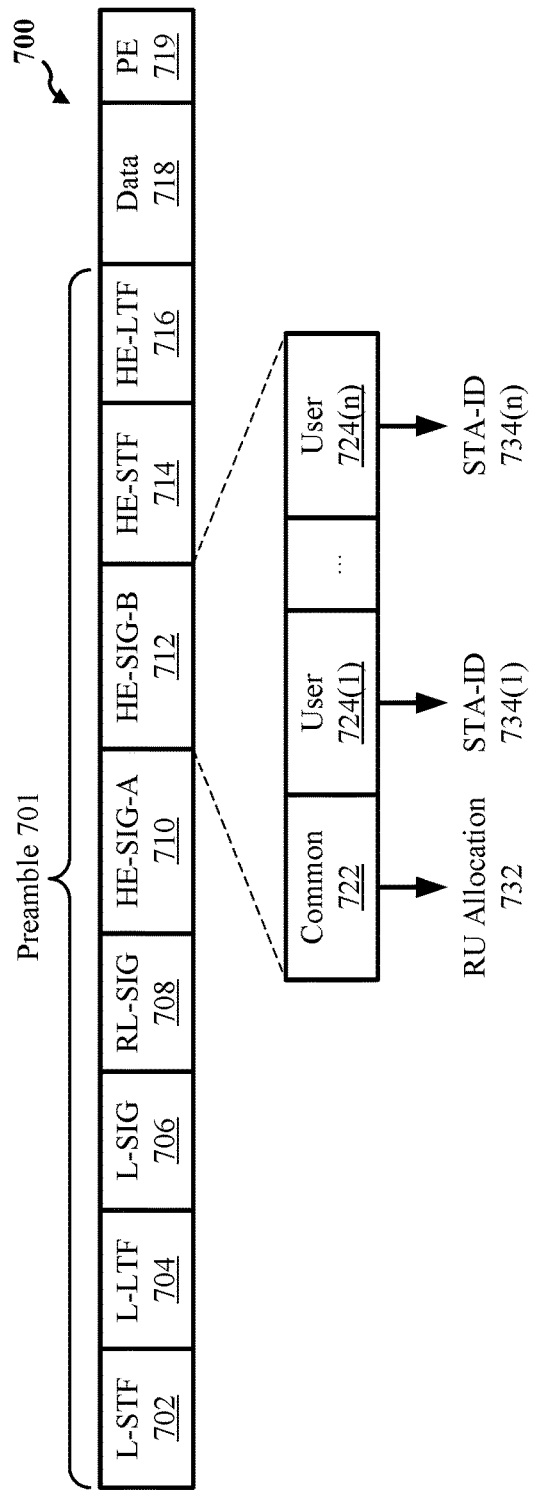
FIG. 7 shows an example multi-user physical layer protocol data unit (MU PPDU).

FIG. 7 shows an example multi-user physical layer protocol data unit (MU PPDU) 700. The MU PPDU 700 may be an example implementation of the MU PPDU 622 of FIG. 6B. The MU PPDU 700, which may be compliant with the IEEE 802.11ax standards, is shown to include a preamble 701 followed by a data field 718 and a packet extension (PE) 719. For example, the Data field 718 may include one or more trigger frames (such as trigger frames 602-604 of FIG. 6B) sent by a multi-BSS AP on behalf of its respective BSSs. In some implementations, each of the trigger frames may be signaled on a respective RU (or set of RUs) allocated for the corresponding BSS. The packet extension 719 may provide additional padding to the MU PPDU 700. For example, in some aspects, the packet extension 719 may include "garbage" information to simply provide the receiving device with additional time to receive and process other information in the MU PPDU 700.

The preamble 701 includes a Legacy Short Training Field (L-STF) 702, a Legacy Long Training Field (L-LTF) 704, a Legacy Signal (L-SIG) 706, a Repeated Legacy Signal (RL-SIG) field 708, a High-Efficiency Signal A (HE-SIG-A) field 710, a High-Efficiency Signal B (HE-SIG-B) field 712, a High-Efficiency Short Training Field (HE-STF) 714, and a High-Efficiency Long Training Field (HE-LTF) 716. The L-STF 702 may include information for coarse frequency estimation, automatic gain control, and timing recovery. The L-LTF 704 may include information for fine frequency estimation, channel estimation, and fine timing recovery. The L-SIG field 706 may include modulation and coding information. The RL-SIG field 708, which may be used to identify the MU PPDU 700 as a High-Efficiency (HE) packet, may include a time-domain waveform generated by repeating the time-domain waveform of the L-SIG field 706.

The HE-SIG-A field 710 may include parameters such as an indicated bandwidth, a payload guard interval (GI), a coding type, a number of spatial streams (Nsts), a space-time block coding (STBC), beamforming information, and the like. In some aspects, the HE-SIG-A field 710 may include one or more sub fields to store parameters describing information stored in the HE-SIG-B field 712. Information contained in the HE-STF 714 may be used to improve automatic gain control estimates for SU-MIMO and MU-MIMO communications, and information contained in the HE-LTF 716 may be used to estimate various MIMO channel conditions.

The HE-SIG-B field 712 may include RU allocation information associated with orthogonal frequency division multiple access (OFDMA) transmissions, for example, as described in the IEEE 802.11ax specification. In some implementations, the HE-SIG-B field may provide resource allocation information to allow receiving STAs to look up the corresponding RUs to be used for each of the trigger frames provided in the Data field 718. More specifically, the HE-SIG-B field 712 includes a Common field 722 and one or more User fields 724(1)-724(n). The Common field 722 may contain RU allocation information 732 regarding the RU assignment to be used in the Data field 718 (such as the size of the RUs and their placement in the frequency domain) and the number of users allocated to each RU. The User fields 724(1)-724(n) may be mapped to the RU allocation information 732 to identify the RUs used to transmit a STA's data. For example, each of the User fields 724(1)-724(n) may contain a STA-ID value 734(1)-734(n), respectively, identifying the STA or group of STAs that is the recipient of an RU in the MU PPDU 700 (such as within the Data field 718).

The STA-ID values 734(1)-734(n) may indicate an assignment of STAs to the RUs indicated in the RU allocation information 732. For example, in some aspects, one or more of the STA-ID values 734(1)-734(n) may correspond to the AID value assigned to a particular STA. In some other aspects, the STA-ID values 734(1)-734(n) may indicate or identify a selected BSS (or BSSs) to which broadcast RUs identified by the RU allocation information 732 are allocated. As used herein, the term "broadcast RU" refers to any RU allocated in a DL MU PPDU for one or more BSSs (including any STAs associated with the BSSs). In some aspects, the STA-ID values 734(1)-734(n) may be used to assign a broadcast RU to a selected BSS of a multi-BSS AP, for example, by setting the STA-ID value associated with the broadcast RU to a value (such as 0, 1, or 2) corresponding to the BSSID index value of the selected BSS. In some other aspects, the STA-ID values 734(1)-734(n) may be used to assign a broadcast RU to the plurality of BSSs provided by the multi-BSS AP (collectively or as a group), for example, by setting the STA-ID value associated with the broadcast RU to a general value (such as 2047) that broadly encompasses the group of BSSs.

Upon detecting a STA-ID value in the MU PPDU 700 for its associated BSS, a STA may decode information in the MU PPDU 700 (such as within the Data field 718) signaled on the broadcast RU assigned to the associated BSS. With reference for example to FIG. 6B, STA-ID values 0-2 may be used to identify a selected one of the three Basic Service Sets BSS1-BSS3 to which a broadcast RU is allocated by the MU PPDU 700. Thus, if the MU PPDU 700 stores a value STA-ID=0, any wireless devices associated with or belonging to BSS1 (such as STA1 and STA2) may receive a trigger frame (or other MPDUs) on a broadcast RU allocated to BSS1; if the MU PDDU 700 stores a value STA-ID=1, any wireless devices associated with or belonging to BSS2 (such as STA3 and STA4) may receive a trigger frame (or other MPDUs) on a broadcast RU allocated to BSS2; if the MU PPDU 700 stores a value STA-ID=2, any wireless devices associated with or belonging to BSS3 (such as STA5 and STAG) may receive a trigger frame (or other MPDUs) on a broadcast RU allocated to BSS3; and if the MU PDDU 700 stores a value STA-ID=2047, any wireless devices associated with or belonging to the multi-BSS AP (such as any of the wireless stations STA1-STAG) may receive a trigger frame (or other MPDUs) on a broadcast RU allocated to the plurality of BSSs provided by the multi-BSS AP.

Mappings between BSSs and STA-ID values may be stored in the AP, for example, as described above with respect to FIG. 3. The AP may share the mappings between BSSs and STA-ID values with its associated wireless devices. In some implementations, the AP may transmit a multiple BSSID element that includes the mapping between BSSs and AID values. In some other implementations, the AP may share the mappings between BSSs and STA-ID values in individual trigger frames transmitted on behalf of each of its BSSs.

Figure 8:
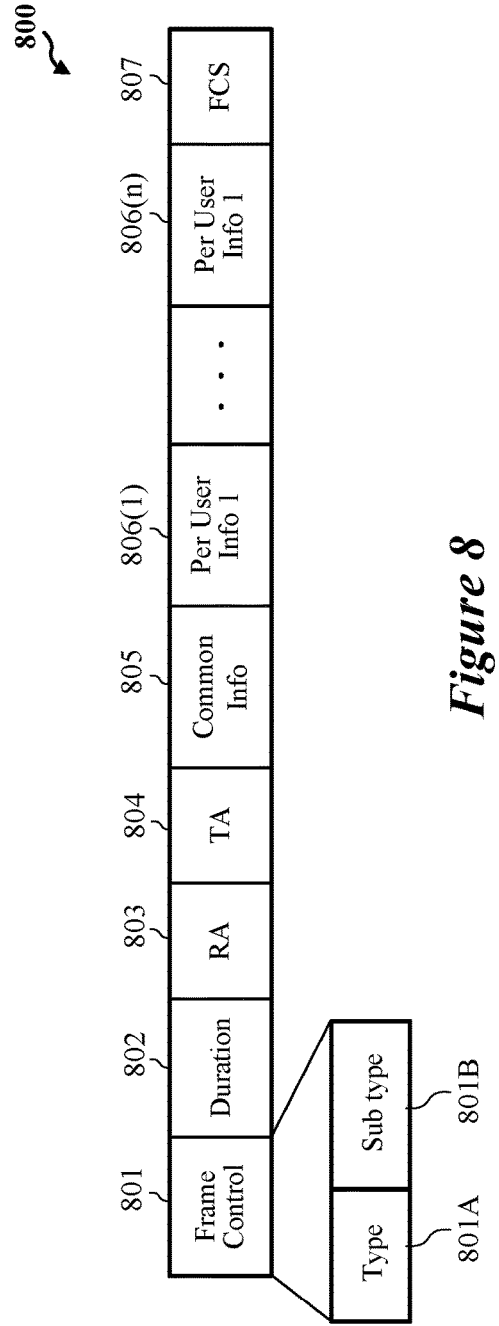
FIG. 8 shows an example trigger frame.

FIG. 8 shows an example trigger frame 800. The trigger frame 800 may be provided in the directed resource allocation message 502 of FIG. 5A, the wildcard resource allocation message 512 of FIG. 5B, or the resource allocation message 522 of FIG. 5C. In some implementations, the trigger frame 800 may correspond to the multi-BSS trigger frame 601 of FIG. 6A. In some other implementations, the trigger frame 800 may correspond to one or more of the trigger frames 602-606 included in the MU PPDU 622. The trigger frame 800 is shown to include a frame control field 801, a duration field 802, a receiver address (RA) field 803, a transmitter address (TA) field 804, a Common Info field 805, a number of Per User Info fields 806(1)-806(n), and a frame check sequence (FCS) field 807.

The frame control field 801 includes a Type field 801A and a Sub-type field 801B. The Type field 801A may store a value to indicate that the trigger frame 800 is a control frame, and the Sub-type field 801B may store a value indicating a type of the trigger frame 800. The duration field 802 may store information indicating a duration or length of the trigger frame 800. The RA field 803 may store the address of a receiving device (such as one of the wireless stations STA1-STAn of FIG. 5A). The TA field 804 may store the address of a transmitting device (such as the AP of FIG. 5A). The Common Info field 805 may store information common to one or more receiving devices, as described in more detail below with respect to FIG. 9A. Each of the Per User Info fields 806(1)-806(n) may store information for a particular receiving device, as described in more detail below with respect to FIG. 9B. The FCS field 807 may store a frame check sequence (such as for error detection).

Figure 9A:
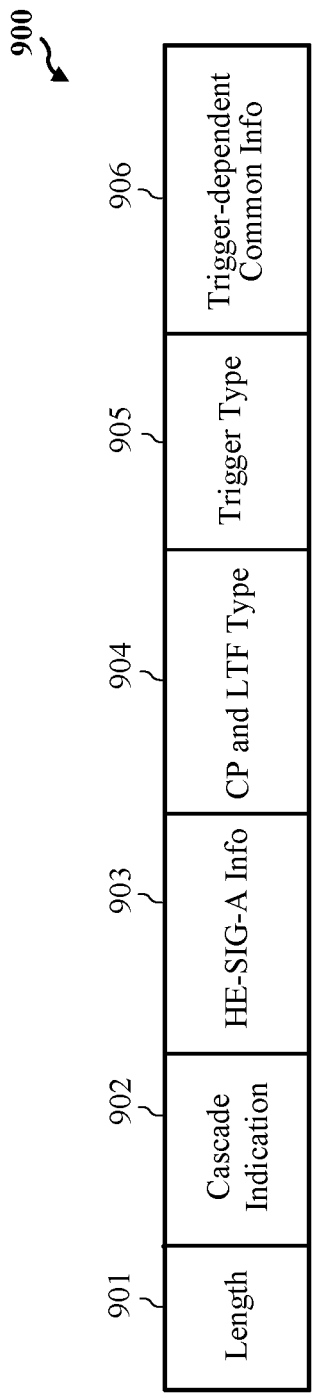
FIG. 9A shows an example common information field.

FIG. 9A shows an example Common Info field 900. The Common Info field 900 may be one implementation of the Common Info field 805 of the trigger frame 800. The Common Info field 900 is shown to include a length subfield 901, a cascade indication subfield 902, a high-efficiency signaling A (HE-SIG-A) info subfield 903, a cyclic prefix (CP) and legacy training field (LTF) type subfield 904, a trigger type subfield 905, and a trigger-dependent common info subfield 906. The length subfield 901 may indicate the length of a legacy signaling field of the UL data frames to be transmitted in response to the trigger frame 800. The cascade indication subfield 902 may indicate whether a subsequent trigger frame follows the current trigger frame. The HE-SIG-A Info subfield 903 may indicate the contents of a HE-SIG-A field of the UL data frames to be transmitted in response to the trigger frame 800. The CP and LTF type subfield 904 may indicate the cyclic prefix and HE-LTF type of the UL data frames to be transmitted in response to the trigger frame 800. The trigger type subfield 905 may indicate the type of trigger frame. The trigger-dependent common info subfield 906 may indicate trigger-dependent information.

Figure 9B:
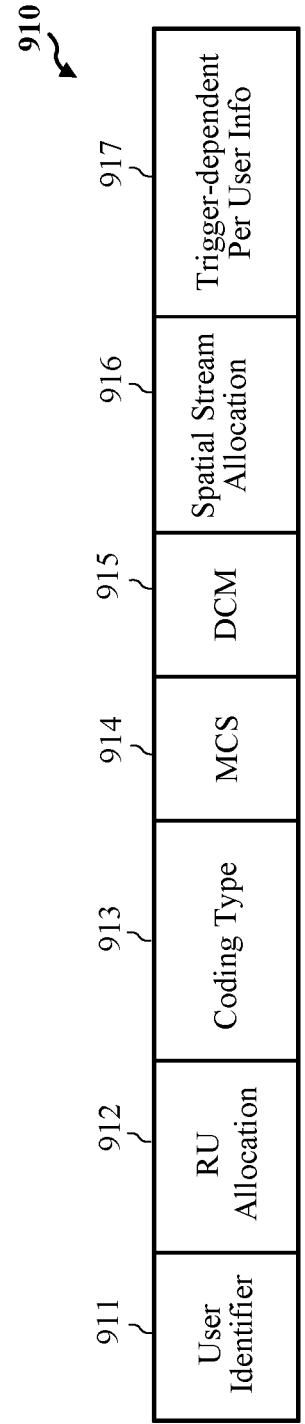
FIG. 9B shows an example Per User Info field.

FIG. 9B shows an example Per User Info field 910. The Per User Info field 910 may be one implementation of the Per User Info fields 806(1)-806(n) of the trigger frame 800. The Per User Info field 910 is shown to include a User Identifier subfield 911, an RU Allocation subfield 912, a Coding Type subfield 913, an MCS subfield 914, a dual-carrier modulation (DCM) subfield 915, a spatial stream (SS) Allocation subfield 916, and a trigger-dependent Per User info subfield 917. The User Identifier subfield 911 may indicate the association identifier (AID) of the STA to which a dedicated RU is allocated for transmitting UL MU data. The RU Allocation subfield 912 may identify the dedicated RU allocated to the corresponding STA (such as the STA identified by the User Identifier subfield 911). The Coding Type subfield 913 may indicate the type of coding to be used by the corresponding STA when transmitting UL data using the allocated RU. The MCS subfield 914 may indicate the MCS to be used by the corresponding STA when transmitting UL data using the allocated RU. The DCM subfield 915 may indicate the dual carrier modulation to be used by the corresponding STA when transmitting UL data using the allocated RU. The SS Allocation subfield 916 may indicate the number of spatial streams to be used by the corresponding STA when transmitting UL data using the allocated RU.

In some implementations, the value of the AID stored in the User Identifier subfield 911 of the Per User Info field 910 of the trigger frame 800 may indicate or identify the selected BSS to which random-access RUs identified in the RU Allocation subfield 912 are allocated (such as when the trigger frame 800 is a multi-BSS trigger frame). In some aspects, the AID stored in the User Identifier subfield 911 may be one of a number (N) of values, for example, to identify a corresponding one of N different BSSs to which one or more random-access RUs are allocated by the trigger frame 800. With reference for example to FIG. 6A, AID values 0-2 may be used to identify a selected one of the three Basic Service Sets BSS1-BSS3 to which the random-access RUs are allocated by the MU PPDU 700. Thus, if the trigger frame 800 stores a value AID=0, any wireless devices associated with or belonging to BSS1 (such as STA1 and STA2) may contend for access to the random-access RUs allocated by the trigger frame 800; if the trigger frame 800 stores a value AID=1, any wireless devices associated with or belonging to a BSS2 (such as STA3 and STA4) may contend for access to the random-access RUs allocated by the trigger frame 800; and if the trigger frame 800 stores a value AID=2, any wireless devices associated with or belonging to BSS3 (such as STA5 and STAG) may contend for access to the random-access RUs allocated by the trigger frame 800.

Mappings between BSSs and AID values may be stored in the AP, for example, as described above with respect to FIG. 3. The AP may share the mappings between BSSs and AID values with its associated wireless devices. In some implementations, the AP may transmit a multiple BSSID set element that includes the mappings between BSSs and AID values. In some aspects, the AP may transmit the multiple BSSID set element in beacon frames broadcast to its associated devices. In other aspects, the AP may transmit the multiple BSSID set element in trigger frames. The multiple BSSID set element may be included in an information element (IE), in a vendor-specific information element (VSIE), in a packet extension, or in any other suitable portion or field of the beacon frames or trigger frames.

In some other implementations, the value of the AID stored in the User Identifier subfield 911 of the Per User Info field 910 of the trigger frame 800 may indicate or identify one or more STAs to which RUs identified in the RU Allocation subfield 912 are allocated (such as when the trigger frame 800 is transmitted, on behalf of an individual BSS, in a MU PPDU). In some aspects, the AID stored in the User Identifier subfield 911 may correspond to a value assigned to a particular STA to which one or more dedicated RUs are allocated by the trigger frame 800. In some other aspects, the AID stored in the User Identifier subfield 911 may correspond to a broadcast value associated with the originating BSS (such as AID=0) or other BSSs of the multi-BSS AP (such as AID=2047) to which random-access RUs identified in the RU Allocation subfield 912 are allocated. For example, if the trigger frame 800 stores a value AID=0, any wireless devices associated with or belonging to the corresponding BSS (such as the BSS that transmitted the trigger frame 800) may contend for access to the random-access RUs allocated by the trigger frame 800; if the trigger frame 800 stores a value AID=2047, any wireless devices associated with or belonging to any BSS of the multi-BSS AP (such as any of the Basic Service Sets BSS1-BSS3) may contend for access to the random-access RUs allocated by the trigger frame 800; and if the trigger frame 800 stores an AID value for a particular STA (such as AID values 3-8 of FIGS. 6A and 6B), only the STA with the corresponding AID value may contend for access to the dedicated RUs allocated by the trigger frame 800.

Aspects of the present disclosure recognize that the IEEE 802.11ax specification defines a "hierarchy" in which RUs may be allocated to STAs or BSSs. At the top of the hierarchy, a STA may first determine whether any RUs have been allocated to that particular STA. For example, if the STA determines that the trigger frame 800 stores an AID corresponding to its own AID value, the STA may send trigger-based (TB) uplink data on only the RU(s) allocated to itself. If the trigger frame 800 does not allocate RUs to the particular STA, the STA may then determine whether any RUs have been allocated to its associated BSS. For example, if the STA determines that the trigger frame 800 stores an AID value of zero, the STA may send TB uplink data on only the RU(s) allocated to its associated BSS. Finally, if the trigger frame 800 does not allocate RUs to its associated BSS, the STA may then determine whether any RUs have been generally allocated to any BSSs of the multi-BSS AP. For example, if the STA determines that the trigger frame 800 stores an AID value of 2047, the STA may send TB uplink data on any of the RU(s) generally allocated to the BSSs of the multi-BSS AP.

Figure 10:
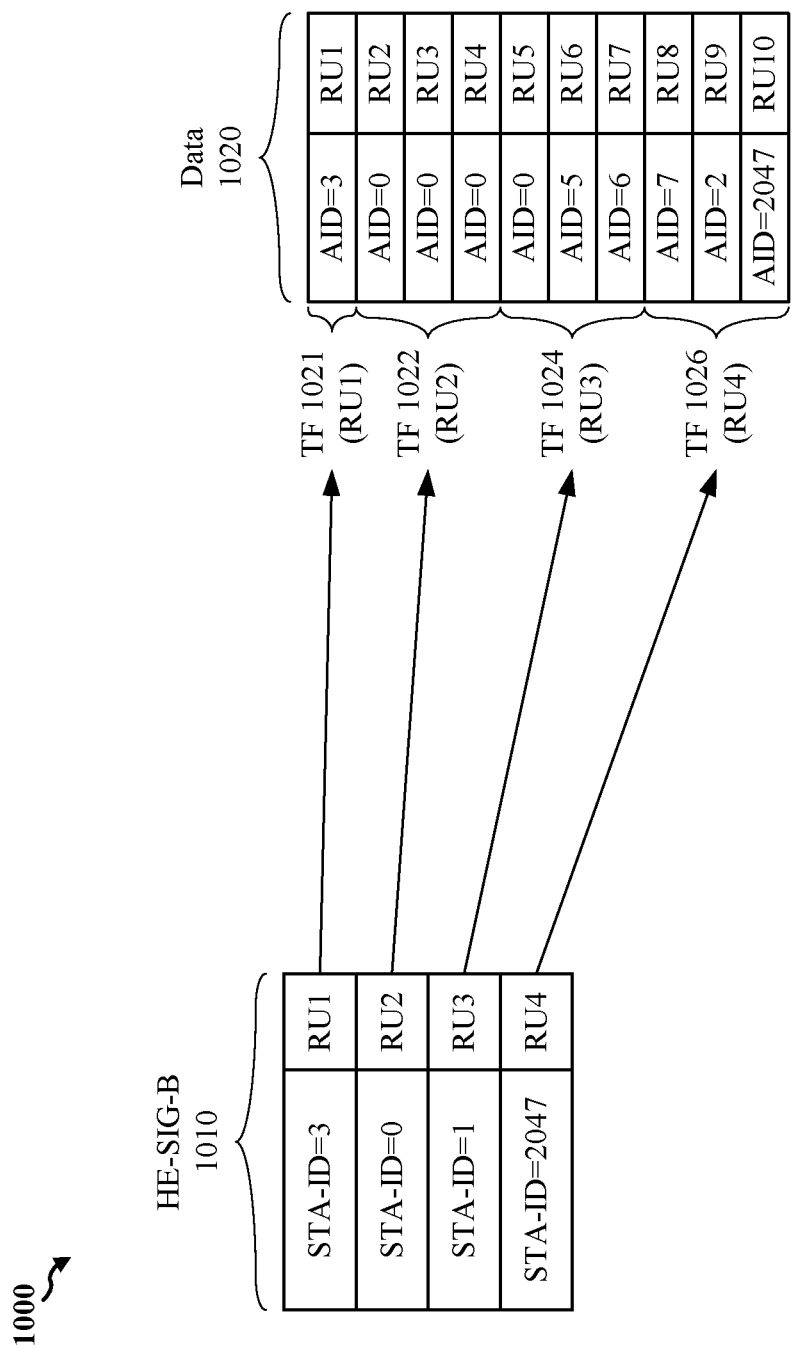
FIG. 10 shows an example allocation of RUs in a DL MU PPDU.

FIG. 10 shows an example allocation of RUs in a DL MU PPDU 1000. The DL MU PPDU 1000 may be an example implementation of the MU PPDU 700 of FIG. 7. For simplicity, only an HE-SIG-B field 1010 and a Data field 1020 are shown in the DL MU PPDU 1000 of FIG. 10. However, in actual implementations, the DL MU PPDU 1000 may include additional fields (and subfields) such as described above with respect to FIG. 7.

The HE-SIG-B field 1010 stores a number of STA-ID values and RU assignments associated with each of the STA-ID values. For example, the STA-ID values may be provided within respective User fields (such as User fields 724(1)-724(n) of FIG. 7) of the HE-SIG-B field 1010 and the RU assignments may be provided within a Common field (such as Common field 722 of FIG. 7) of the HE-SIG-B field 1010. In the example of FIG. 10, the HE-SIG-B field 1010 is shown to store STA-ID values 0, 1, 3, and 2047. Furthermore, the STA-ID value 3 is assigned a first resource unit RU1, the STA-ID value 0 is assigned a second resource unit RU2, the STA-ID value 1 is assigned a third resource unit RU3, and the STA-ID value 2047 is assigned a fourth resource unit RU4. Each set of RUs may correspond to a respective MPDU (such as a trigger frame) transmitted in the Data field 1020 of the DL MU PPDU 1000. Thus, in some aspects, each of the STA-ID values 0, 1, 3, and 2047 may point to a respective trigger frame carried in the DL MU PPDU 1000.

The Data field 1020 stores a number of trigger frames (TF) 1021-1026. In the example of FIG. 10, a first trigger frame 1021 is signaled on the first resource unit RU1, a second trigger frame 1022 is signaled on the second resource unit RU2, a third trigger frame 1024 is signaled on the third resource unit RU3, and a fourth trigger frame 1026 is signaled on the fourth resource unit RU4. Each of the trigger frames 1021-1026 may be used to allocate uplink RUs to one or more STAs associated with a particular BSS or set of BSSs. For example, the first trigger frame 1021 may allocate the first resource unit RU1 to STA1 (such as by storing an AID value 3 in association with RU1). The second trigger frame 1022 may allocate the resource units RU2-RU4 to any wireless devices associated with or otherwise belonging to its BSS (such as by storing an AID value 0 in association with each of the resource units RU2-RU4). The third trigger frame 1024 may allocate RU5 to any wireless device associated with or otherwise belonging to its BSS (such as by storing an AID value 0 in association with RU5) and may allocate RU6 and RU7 to individual wireless devices assigned to AID values 5 and 6, respectively. The fourth trigger frame 1026 may allocate RU8 to an individual wireless device assigned to AID value 7, may allocate RU9 to any wireless device associated with or otherwise belonging to BSS3 (such as by storing an AID value 2 in association with RU9), and may further allocate RU10 to any wireless device associated with the multi-BSS AP (such as by storing an AID value 2047 in association with RU10).

A STA that receives the DL MU PPDU 1000 may decode the information provided in the HE-SIG-B field 1010 to identify an RU on which it is to receive downlink data (such as within the Data field 1020 of the DL MU PPDU 1000). The STA may then access the MPDU (such as a trigger frame) signaled on the assigned RU in the HE-SIG-B field 1010. In some implementations, the STA may decode the trigger frame signaled on the assigned RU to determine which (if any) of RUs have been allocated to that particular STA for uplink transmissions. With reference for example to FIG. 6B, STA1 may determine, based on the STA-ID value 3 in the HE-SIG-B field 1010, that it has been assigned the first resource unit RU1. Accordingly, STA1 may retrieve the first trigger frame 1021 signaled on RU1 of the Data field 1020. Since the first trigger frame allocates RU1 for access by STA1 only, STA1 may have uncontested access to RU1 for uplink transmissions.

It is noted that the DL MU PPDU 1000 does not include an RU assignment for any other individual STAs. However, STA2 may determine, based on the STA-ID value 0 in the HE-SIG-B field 1010, that the second resource unit RU2 has been assigned to its associated BSS (BSS1). Accordingly, STA2 may retrieve the second trigger frame 1022 signaled on RU2 of the Data field 1020. Since the second trigger frame 1022 allocates the set of resource units RU2-RU4 for random access to any STAs associated with BSS1 (and does not allocate any RUs to individual STAs), STA2 may contend for access to any of the resource units RU2-RU4. In some implementations, even though STA1 is also associated BSS1, STA1 may not retrieve the second trigger frame 1022 (or contend for access on the resource units RU2-RU4) since it has been assigned its own directed trigger frame 1021.

The wireless stations STA3 and STA4 may determine, based on the STA-ID value 1 in the HE-SIG-B field 1010, that the third resource unit RU3 has been assigned to their associated BSS (BSS2). Accordingly, STA3 and STA4 may retrieve the third trigger frame 1024 signaled on RU3 of the Data field 1020. Since the third trigger frame 1024 allocates resource units RU6 and RU7 to individual wireless devices assigned to AID values 5 and 6, respectively, STA3 (assigned to AID value 5) may have uncontested access to RU6 and STA4 (assigned to AID value 6) may have uncontested access to RU7. In some implementations, even though the third trigger frame 1024 further allocates RU5 for random access to any of its associated STAs, neither STA3 nor STA4 may contend for access on RU5 since they have each been assigned their own individual RUs.

It is noted that the DL MU PPDU 1000 does not include an RU assignment for BSS3. However, STA5 and STA6 may determine, based on the STA-ID value 2047 in the HE-SIG-B field 1010, that the fourth resource unit RU4 has been generally assigned to their associated BSS (BSS3). As described above with respect to FIG. 9B, the STA-ID value 2047 may be generally associated with any (and all) BSSs provided by a multi-BSS AP. Accordingly, STA5 and STA6 may retrieve the fourth trigger frame 1026 signaled on RU4 of the Data field 1020. Since the fourth trigger frame 1026 allocates RU8 for access by STA5 only, STA5 may have uncontested access to RU8 for uplink transmissions. Although the fourth trigger frame 1026 does not allocate any dedicated RUs to STA6, the fourth trigger frame 1026 does allocate RU9 for random access to any STAs associated with BSS3. Thus, STA2 may contend for access to RU9. The fourth trigger frame 1026 further allocates RU10 for random access to any wireless devices associated with any BSS of the multi-BSS AP. However, because STA5 has been allocated a dedicated RU (RU8) and STA6 has been allocated a random-access RU (RU9) through its associated BSS, neither STA5 nor STA6 may contend for access on RU10.

Figure 11:
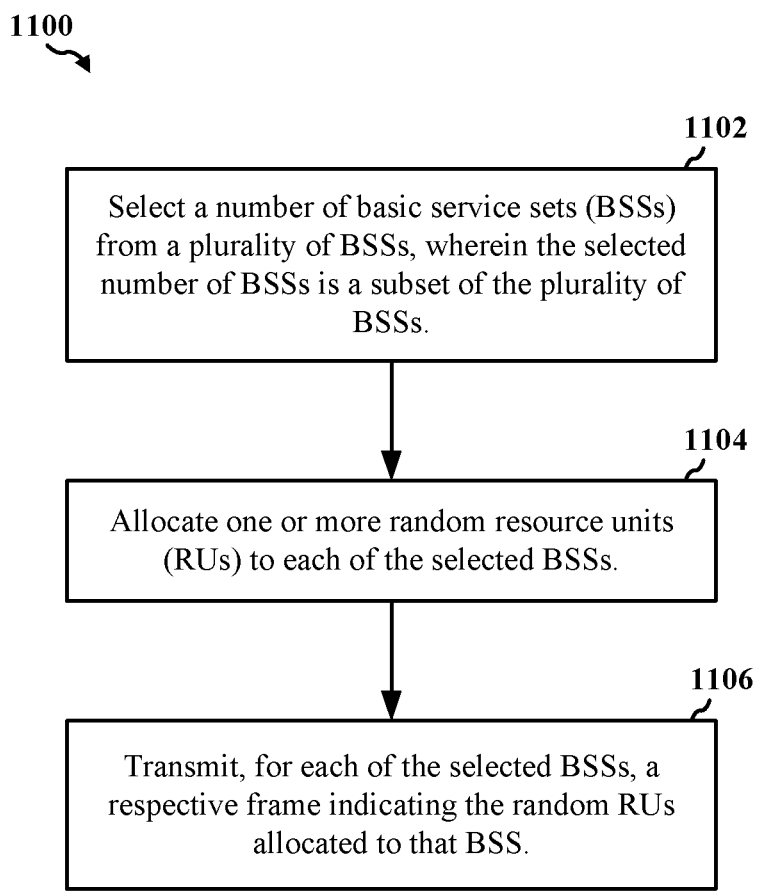
FIG. 11 shows an illustrative flow chart depicting an example operation for allocating random-access RUs to a selected basic service set (BSS).

FIG. 11 shows an illustrative flow chart depicting an example operation 1100 for allocating random-access RUs to a selected number of basic service sets (BSSs) operated by an AP, in accordance with aspects of the present disclosure. The AP may be the AP 110 of FIG. 1A, the AP of FIG. 1B, the AP 300 of FIG. 3, or the AP 620 of FIG. 6B.

First, the AP selects a number of basic service sets (BSSs) from a plurality of BSSs, wherein the selected number of BSSs is a subset of the plurality of BSSs (1102). In some aspects, the AP may base the selection of the BSS(s) on at least one of: security parameters of the plurality of BSSs, access privileges of wireless devices belonging to the plurality of BSSs, types of wireless devices belonging to the plurality of BSSs, quality of service (QoS) parameters of the plurality of BSSs, and delay requirements of wireless devices belonging to the plurality of BSSs.

Then, the AP allocates one or more random-access resource units (RUs) to each of the selected BSSs (1104). In some implementations, the one or more random-access RUs may be contention-based resources that are to be shared by a number of wireless devices belonging to a corresponding one of the selected BSSs. In some aspects, a size of the one or more random-access RUs may be based, at least in part, on a bandwidth of the wireless devices belonging to the corresponding one of the selected BSSs.

Next, the AP transmits, for each of the selected BSSs, a respective frame indicating the random-access RUs allocated to that BSS (1106). In some implementations, each of the frames may be a trigger frame that includes one or more AID values of zero. In some aspects, the AID values may be stored in a per user information field of the trigger frame. In other aspects, the AID values may be stored in another suitable portion or field of the trigger frame. In some implementations, the trigger frames may be aggregated or combined in a DL MU PPDU. For example, each of the trigger frames may be transmitted on a respective subset of the one or more random-access RUs within a Data field of the DL MU PPDU. More specifically, for each of the selected BSSs, the respective trigger frame may be transmitted on the random-access RUs allocated to that BSS.

Thereafter, the AP may receive uplink data, on the one or more random-access RUs allocated by the frames, from a number of wireless devices belonging to at least one of the selected BSSs. In this manner, the wireless devices belonging to the at least one of the selected BSSs may use the random-access RUs without contending with wireless devices belonging to non-selected BSSs.

As used herein, a phrase referring to "at least one of" a list of items refers to any combination of those items, including single members. As an example, "at least one of: a, b, or c" is intended to cover: a, b, c, a-b, a-c, b-c, and a-b-c.

The various illustrative logics, logical blocks, modules, circuits and algorithm processes described in connection with the implementations disclosed herein may be implemented as electronic hardware, computer software, or combinations of both. The interchangeability of hardware and software has been described generally, in terms of functionality, and illustrated in the various illustrative components, blocks, modules, circuits and processes described above. Whether such functionality is implemented in hardware or software depends upon the particular application and design constraints imposed on the overall system.

The hardware and data processing apparatus used to implement the various illustrative logics, logical blocks, modules and circuits described in connection with the aspects disclosed herein may be implemented or performed with a general purpose single- or multi-chip processor, a digital signal processor (DSP), an application specific integrated circuit (ASIC), a field programmable gate array (FPGA) or other programmable logic device, discrete gate or transistor logic, discrete hardware components, or any combination thereof designed to perform the functions described herein. A general purpose processor may be a microprocessor, or, any conventional processor, controller, microcontroller, or state machine. A processor also may be implemented as a combination of computing devices such as, for example, a combination of a DSP and a microprocessor, a plurality of microprocessors, one or more microprocessors in conjunction with a DSP core, or any other such configuration. In some implementations, particular processes and methods may be performed by circuitry that is specific to a given function.

In one or more aspects, the functions described may be implemented in hardware, digital electronic circuitry, computer software, firmware, including the structures disclosed in this specification and their structural equivalents thereof, or in any combination thereof. Implementations of the subject matter described in this specification also can be implemented as one or more computer programs, i.e., one or more modules of computer program instructions, encoded on a computer storage media for execution by, or to control the operation of, data processing apparatus.

If implemented in software, the functions may be stored on or transmitted over as one or more instructions or code on a computer-readable medium. The processes of a method or algorithm disclosed herein may be implemented in a processor-executable software module which may reside on a computer-readable medium. Computer-readable media includes both computer storage media and communication media including any medium that can be enabled to transfer a computer program from one place to another. A storage media may be any available media that may be accessed by a computer. By way of example, and not limitation, such computer-readable media may include RAM, ROM, EEPROM, CD-ROM or other optical disk storage, magnetic disk storage or other magnetic storage devices, or any other medium that may be used to store desired program code in the form of instructions or data structures and that may be accessed by a computer. Also, any connection can be properly termed a computer-readable medium. Disk and disc, as used herein, includes compact disc (CD), laser disc, optical disc, digital versatile disc (DVD), floppy disk, and blu-ray disc where disks usually reproduce data magnetically, while discs reproduce data optically with lasers. Combinations of the above should also be included within the scope of computer-readable media. Additionally, the operations of a method or algorithm may reside as one or any combination or set of codes and instructions on a machine readable medium and computer-readable medium, which may be incorporated into a computer program product.

Various modifications to the implementations described in this disclosure may be readily apparent to those skilled in the art, and the generic principles defined herein may be applied to other implementations without departing from the spirit or scope of this disclosure. Thus, the claims are not intended to be limited to the implementations shown herein, but are to be accorded the widest scope consistent with this disclosure, the principles and the novel features disclosed herein.

What is claimed is:

1. A method performed at wireless station (STA) belonging to a first basic service set (BSS), comprising:
   receiving, from an access point (AP) operating a plurality of BSSs that include the first BSS, a physical layer protocol data unit (PPDU) carrying two or more trigger frames, each trigger frame allocating one or more random access resource units (RUs) to STAs associated with a respective BSS of the plurality of BSSs, each trigger frame including an association identifier (AID) value of zero; and
   transmitting uplink (UL) data to the AP over the one or more random access RUs allocated to the STAs associated with the first BSS responsive to the AID value of zero.

2. The method of claim 1, wherein each trigger frame is received over a different RU.

3. The method of claim 1, wherein each trigger frame is received over an RU allocated to the respective BSS of the plurality of BSSs.

4. The method of claim 1, wherein the PPDU comprises a downlink (DL) multi-user (MU) PPDU.

5. The method of claim 1, wherein a first trigger frame of the two or more trigger frames allocates a directed RU to the STA.

6. The method of claim 1, wherein at least one of the two or more trigger frames allocates additional random access RUs to STAs that are not associated with the first BSS.

7. The method of claim 1, wherein at least one of the two or more trigger frames includes an AID value of 2047.

8. The method of claim 1, wherein the plurality of BSSs include a transmitted BSS and one or more non-transmitted BSSs of a multiple BSS identifier (BSSID) set, the first BSS corresponding to the transmitted BSS.

9. The method of claim 8, wherein the AP is associated with the transmitted BSS, and at least one of the two or more trigger frames allocates additional random access RUs to STAs associated with at least one of the one or more non-transmitted BSSs.

10. The method of claim 8, wherein the PPDU includes:
    a first trigger frame associated with the first BSS and including an AID value set to a BSSID index of the transmitted BSS; and
    one or more additional trigger frames associated with the one or more respective non-transmitted BSSs, each trigger frame of the one or more additional trigger frames including an AID value set to the BSSID index of a respective non-transmitted BSS.

11. The method of claim 8, wherein the PPDU includes:
    a first station identifier (STA-ID) value set to a BSSID index of the transmitted BSS; and
    one or more additional STA-ID values set to one or more respective BSSID indices of the one or more non-transmitted BSSs.

12. The method of claim 11, wherein the first STA-ID value and the one or more additional STA-ID values are carried in a physical-layer (PHY) preamble of the PPDU.

13. The method of claim 1, wherein the two or more trigger frames comprise a broadcast frame addressed to all STAs associated with or belonging to a respective BSS of the plurality BSSs.

14. The method of claim 1, wherein the two or more trigger frames comprise a multicast frame addressed to a group of STAs associated with or belonging to a respective BSS of the plurality of BSSs.

15. The method of claim 1, wherein the one or more random access RUs include contention based resources to be shared by the STA with other STAs belonging to the first BSS.

16. The method of claim 1, further comprising:
contending for access to the one or more allocated random access RUs responsive to the AID value of zero.

17. A wireless communication device belonging to a first basic service set (BSS), comprising:
one or more transceivers;
one or more processors; and
a memory storing instructions that, when executed by the one or more processors, cause the wireless communication device to:
receive, via the one or more transceivers from an access point (AP) operating a plurality of BSSs that includes the first BSS, a physical layer protocol data unit (PPDU) carrying two or more trigger frames, each trigger frame allocating one or more random access resource units (RUs) to wireless stations (STAs) associated with a respective BSS of the plurality of BSSs, each trigger frame including an association identifier (AID) value of zero; and
transmit, via the one or more transceivers, uplink (UL) data to the AP over the one or more random access RUs allocated to the STAs associated with the first BSS responsive to the AID value of zero.

18. The wireless communication device of claim 17, wherein each trigger frame is received over an RU allocated to the respective BSS of the plurality of BSSs.

19. The wireless communication device of claim 17, wherein the PPDU comprises a downlink (DL) multi-user (MU) PPDU.

20. The wireless communication device of claim 17, wherein a first trigger frame of the two or more trigger frames allocates a directed RU to the wireless communication device.

21. The wireless communication device of claim 17, wherein at least one of the two or more trigger frames allocates additional random access RUs to STAs that are not associated with the first BSS.

22. The wireless communication device of claim 17, wherein the plurality of BSSs includes a transmitted BSS and one or more non-transmitted BSSs of a multiple BSSID set, the first BSS corresponding to the transmitted BSS.

23. The wireless communication device of claim 22, wherein the AP is associated with the transmitted BSS, and at least one of the two or more trigger frames allocates additional random access RUs to STAs associated with at least one of the one or more non-transmitted BSSs.

24. The wireless communication device of claim 22, wherein the PPDU includes:
a first trigger frame associated with the first BSS and including an AID value set to a BSSID index of the transmitted BSS; and
one or more additional trigger frames associated with the one or more respective non-transmitted BSSs, each trigger frame of the one or more additional trigger frames including an AID value set to the BSSID index of a respective non-transmitted BSS.

25. The wireless communication device of claim 22, wherein the PPDU includes:
a first station identifier (STA-ID) value set to a BSSID index of the transmitted BSS; and
one or more additional STA-ID values set to one or more respective BSSID indices of the one or more non-transmitted BSSs.

26. The wireless communication device of claim 25, wherein the first STA-ID value and the one or more additional STA-ID values are carried in a physical-layer (PHY) preamble of the PPDU.

27. The wireless communication device of claim 17, wherein the two or more trigger frames comprise a broadcast PPDU addressed to all STAs associated with or belonging to a respective BSS of the plurality of BSSs.

28. The wireless communication device of claim 17, wherein the two or more trigger frames comprise a multicast frame addressed to a group of STAs associated with or belonging to a respective BSS of the plurality of BSSs.

29. The wireless communication device of claim 17, wherein the one or more random access RUs include contention based resources to be shared by the wireless communication device with STAs belonging to the first BSS.

30. The wireless communication device of claim 17, wherein execution of the instructions by the one or more processors further causes the wireless communication device to:
contend for access to the one or more allocated random access RUs responsive to the AID value of zero.

* * * * *